US012795620B2

(12) United States Patent
Farag

(10) Patent No.: US 12,795,620 B2
(45) Date of Patent: Nov. 10, 2026

(54) METHOD AND APPARATUS FOR LTE/NR SL CO-EXISTENCE

(71) Applicant: Samsung Electronics Co., Ltd., Suwon-si (KR)

(72) Inventor: Emad Nader Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 508 days.

(21) Appl. No.: 18/461,219

(22) Filed: Sep. 5, 2023

(65) Prior Publication Data

US 2024/0114491 A1 Apr. 4, 2024

Related U.S. Application Data

(60) Provisional application No. 63/457,658, filed on Apr. 6, 2023, provisional application No. 63/457,673, filed (Continued)

(51) Int. Cl.
*H04W 72/0446* (2023.01)
*H04B 17/318* (2015.01)
(Continued)

(52) U.S. Cl.
CPC ....... *H04W 72/0446* (2013.01); *H04W 72/25* (2023.01); *H04W 72/541* (2023.01); *H04W 16/14* (2013.01)

(58) Field of Classification Search
CPC ............. H04W 72/02; H04W 72/0446; H04W 72/0473; H04W 72/0808; H04W 72/1215;
(Continued)

(56) References Cited

U.S. PATENT DOCUMENTS

2018/0279303 A1* 9/2018 Sun ........................ H04W 72/12
2021/0204307 A1* 7/2021 Lee ..................... H04W 72/569
(Continued)

FOREIGN PATENT DOCUMENTS

KR 10-2022-0068234 A 5/2022

OTHER PUBLICATIONS

International Search Report and Written Opinion issued Dec. 26, 2023 regarding International Application No. PCT/KR2023/013816, 7 pages.
(Continued)

*Primary Examiner* — Moo Jeong
*Assistant Examiner* — Scott A Schlack

(57) ABSTRACT

A UE includes a transceiver configured to receive and transmit on a LTE SL interface with a first sub carrier spacing (SCS), and receive and transmit on a NR SL interface with a second SCS larger than the first SCS. A LTE SL subframe overlaps in time with N NR SL slots. The UE further includes a processor operably coupled to the transceiver. The processor is configured to perform sensing over the LTE SL interface, identify a presence of a LTE SL transmission in a first LTE SL sub-frame, and identify candidate NR SL resources for NR SL resource selection or reselection in N NR SL slots overlapping the first LTE SL sub-frame. To perform the sensing, the processor is further configured to decode SL control information, and measure an SL reference signal receive power associated with the SCI. The transceiver is further configured to transmit in the N NR SL slots.

20 Claims, 29 Drawing Sheets

Related U.S. Application Data on Apr. 6, 2023, provisional application No. 63/414,326, filed on Oct. 7, 2022, provisional application No. 63/410,044, filed on Sep. 26, 2022, provisional application No. 63/410,052, filed on Sep. 26, 2022.

(51) Int. Cl.

| | |
|---|---|
| ***H04L 5/00*** | (2006.01) |
| ***H04L 27/26*** | (2006.01) |
| ***H04W 24/08*** | (2009.01) |
| ***H04W 72/02*** | (2009.01) |
| ***H04W 72/044*** | (2023.01) |
| ***H04W 72/12*** | (2023.01) |
| ***H04W 72/1263*** | (2023.01) |
| ***H04W 72/25*** | (2023.01) |
| ***H04W 72/541*** | (2023.01) |
| ***H04W 74/0808*** | (2024.01) |
| ***H04W 76/14*** | (2018.01) |
| ***H04W 92/18*** | (2009.01) |
| *H04W 16/14* | (2009.01) |

(58) Field of Classification Search

CPC . H04W 72/1263; H04W 72/14; H04W 72/25; H04W 72/40; H04W 72/541; H04W 72/56; H04W 16/14; H04W 92/18; H04L 5/0055; H04L 5/0073; H04B 17/328

See application file for complete search history.

(56) References Cited

U.S. PATENT DOCUMENTS

| | | | | |
|---|---|---|---|---|
| 2022/0394698 | A1 | 12/2022 | Lee et al. | |
| 2023/0354270 | A1* | 11/2023 | Lee | H04B 17/328 |
| 2024/0032075 | A1* | 1/2024 | Ye | H04W 72/40 |
| 2024/0057065 | A1* | 2/2024 | Jacobsen | H04L 5/0003 |
| 2024/0098730 | A1* | 3/2024 | Dutta | H04W 72/1263 |
| 2024/0349311 | A1* | 10/2024 | Sun | H04W 4/40 |
| 2025/0119854 | A1* | 4/2025 | Yoshioka | H04W 28/26 |
| 2025/0185047 | A1* | 6/2025 | Shimizu | H04W 74/0808 |

OTHER PUBLICATIONS

Huawei et al., "Co-channel coexistence for LTE sidelink and NR sidelink", 3GPP TSG RAN WG1 Meeting #110, R1-2205888, Aug. 2022, 14 pages.

Mediatek Inc., "Co-channel coexistence for NR sidelink and LTE sidelink", 3GPP TSG RAN WG1 Meeting #110, R1-2207010, Aug. 2022, 6 pages.

Mediatek Inc., "On co-channel coexistence between LTE sidelink and NR sidelink", 3GPP TSG RAN WG1 #109-e, R1-2204720, Apr. 2022, 6 pages.

Samsung, "On co-channel coexistence for LTE sidelink and NR sidelink", 3GPP TSG RAN WG1 Meeting #110, R1-2206828, Aug. 2022, 7 pages.

"5G; NR; Physical channels and modulation (3GPP TS 38.211 version 17.5.0 Release 17)", ETSI TS 138 211 V17.5.0, Jul. 2023, 141 pages.

"5G; NR; Multiplexing and channel coding (3GPP TS 38.212 version 17.5.0 Release 17)", ETSI TS 138 212 V17.5.0, Apr. 2023, 206 pages.

"5G; NR; Physical layer procedures for control (3GPP TS 38.213 version 17.6.0 Release 17)", ETSI TS 138 213 V17.6.0, Jul. 2023, 265 pages.

"5G; NR; Physical layer procedures for data (3GPP TS 38.214 version 17.6.0 Release 17)", ETSI TS 138 214 V17.6.0, Jul. 2023, 236 pages.

"5G; NR; Medium Access Control (MAC) protocol specification (3GPP TS 38.321 version 17.5.0 Release 17)", ETSI TS 138 321 V17.5.0, Jul. 2023, 255 pages.

"5G; NR; Radio Resource Control (RRC); Protocol specification (3GPP TS 38.331 version 17.5.0 Release 17)", ETSI TS 138 331 V17.5.0, Jul. 2023, 1304 pages.

"LTE; Evolved Universal Terrestrial Radio Access (E-UTRA); Physical layer procedures (3GPP TS 36.213 version 17.5.0 Release 17)", ETSI TS 136 213 V17.5.0, Apr. 2023, 569 pages.

LG Electronics, "WID revision: NR sidelink enhancement", 3GPP TSG RAN Meeting #88e, RP-201385, Jun. 2020, 6 pages.

* cited by examiner

LTE SL resources and NR SL Resources are FDMed

LTE SL resources and NR SL Resources are TDMed

LTE SL resources and NR SL Resources are FDMed and TDMed

Partially overlapping LTE and NR SL Resources with separate LTE resources and NR resources (example 1)

Partially overlapping LTE and NR SL Resources with separate LTE resources and NR resources (example 2)

Partially overlapping LTE and NR SL Resources with separate LTE resources (example 1)

Power ramped up symbol-group-wise in first Ng (e.g., 2 in the figure) symbol-groups. D are PSSCH DMRS symbols.

Power ramped down in last symbol

Power ramped down in last N (e.g., 3 in the figure) symbols

Power ramped down in extra symbol added

Power ramped down symbol-wise in last N (e.g., 3 in the figure) symbols

Power ramped down symbol-group-wise in last Ng (e.g., 2 in the figure) symbol-groups.
D are PSSCH DMRS symbols.

Power ramped up in PSFCH duplicate symbol

Power ramped up in extra symbol added

Power ramped up symbol-wise in PSFCH duplicate symbol

METHOD AND APPARATUS FOR LTE/NR SL CO-EXISTENCE

CROSS-REFERENCE TO RELATED APPLICATIONS AND CLAIM OF PRIORITY

This application claims priority under 35 U.S.C. § 119(e) to U.S. Provisional Patent Application No. 63/410,044 filed on Sep. 26, 2022, U.S. Provisional Patent Application No. 63/410,052 filed on Sep. 26, 2022, U.S. Provisional Patent Application No. 63/414,326 filed on Oct. 7, 2022, U.S. Provisional Patent Application No. 63/457,658 filed on Apr. 6, 2023, and U.S. Provisional Patent Application No. 63/457,673 filed on Apr. 6, 2023. The above-identified provisional patent applications are hereby incorporated by reference in their entirety.

TECHNICAL FIELD

This disclosure relates generally to wireless networks. More specifically, this disclosure relates to methods and apparatuses for LTE/NR SL co-existence.

BACKGROUND

The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure provides methods and apparatuses for LTE/NR SL co-existence.

In one embodiment, a user equipment (UE) is provided. The UE includes a transceiver configured to receive and transmit on a LTE sidelink (SL) interface with a first sub carrier spacing (SCS), and receive and transmit on a NR SL interface with a second SCS larger than the first SCS. A LTE SL subframe overlaps in time with N NR SL slots. The UE further includes a processor operably coupled to the transceiver. The processor is configured to perform sensing over the LTE SL interface, identify a presence of a LTE SL transmission in a first LTE SL sub-frame, and identify candidate NR SL resources for NR SL resource selection or reselection in N NR SL slots overlapping the first LTE SL sub-frame. To perform the sensing, the processor is further configured to decode SL control information (SCI), and measure an SL reference signal receive power (SL-RSRP) associated with the SCI. The transceiver is further configured to transmit in the N NR SL slots.

In another embodiment a method is provided. The method includes receiving and transmitting on a LTE SL interface with a first sub carrier spacing (SCS), receiving and transmitting on a NR SL interface with a second SCS larger than the first SCS, wherein a LTE SL subframe overlaps in time with N NR SL slots, performing sensing over the LTE SL interface. Performing the sensing further includes decoding SCI, and measuring an SL-RSRP associated with the SCI. The method further includes identifying a presence of a LTE SL transmission in a first LTE SL sub-frame, identifying candidate NR SL resources for NR SL resource selection or reselection in N NR SL slots overlapping the first LTE SL sub-frame, and transmitting in the N NR SL slots.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 28, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
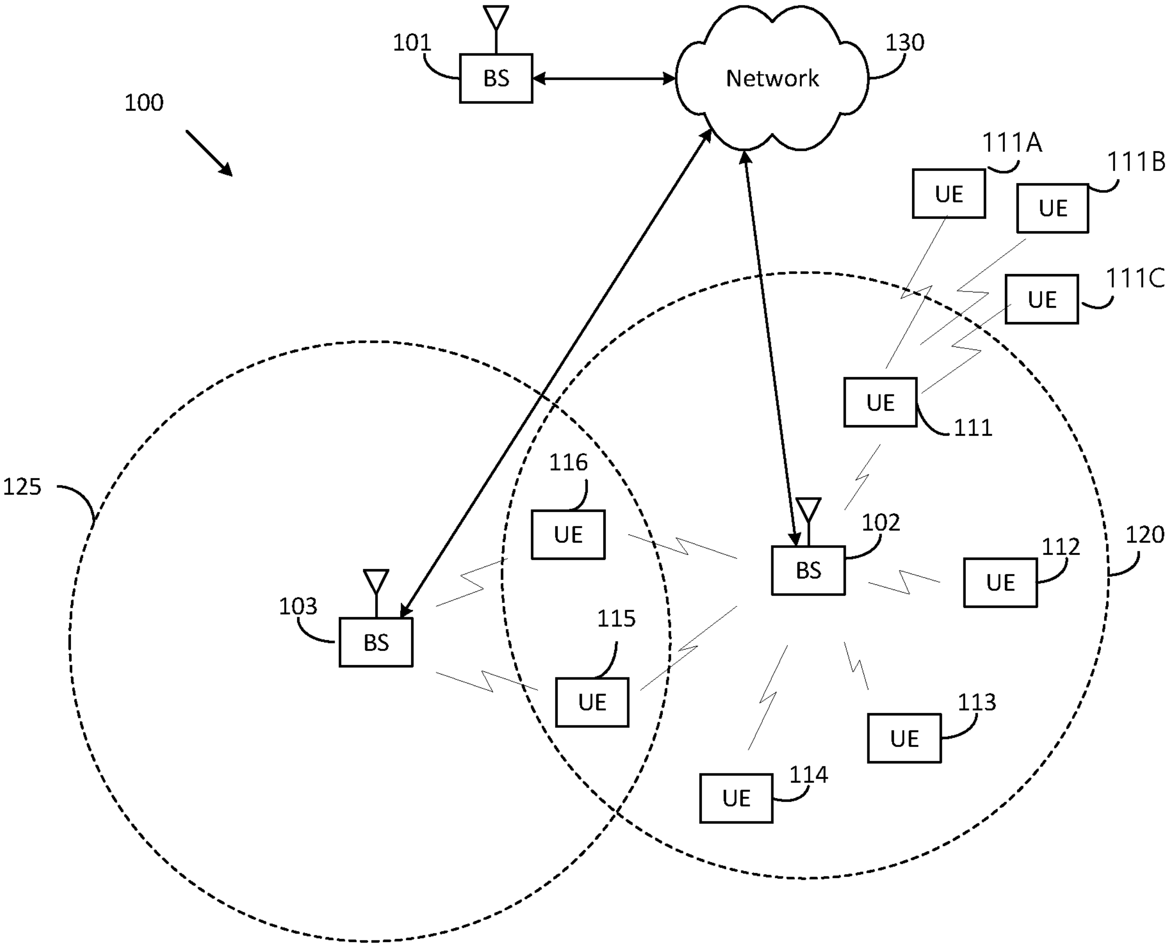
FIG. 1 illustrates an example wireless network according to embodiments of the present disclosure.
Figure 2A:
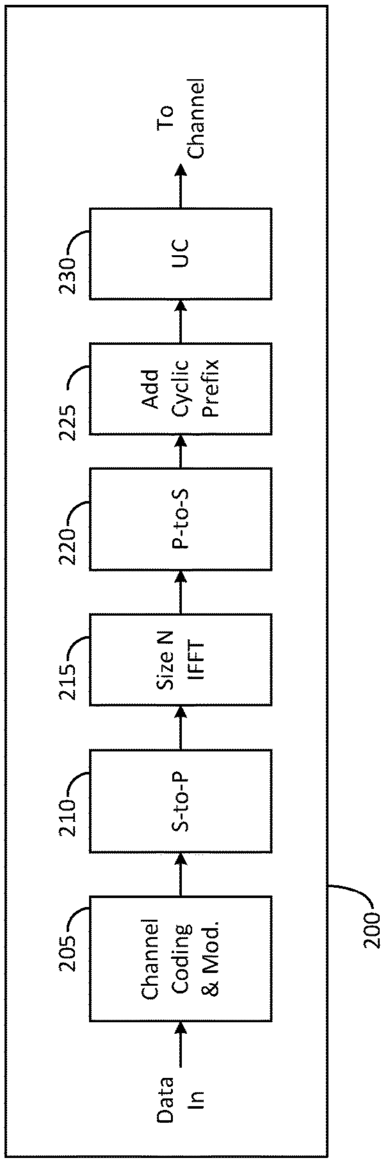
FIGS. 2A and 2B illustrate example wireless transmit and receive paths according to embodiments of the present.
Figure 2B:
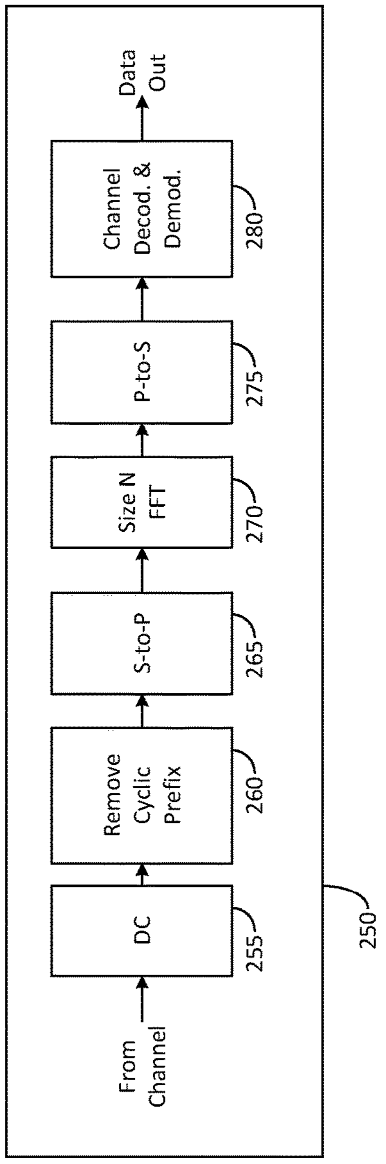
Figure 3A:
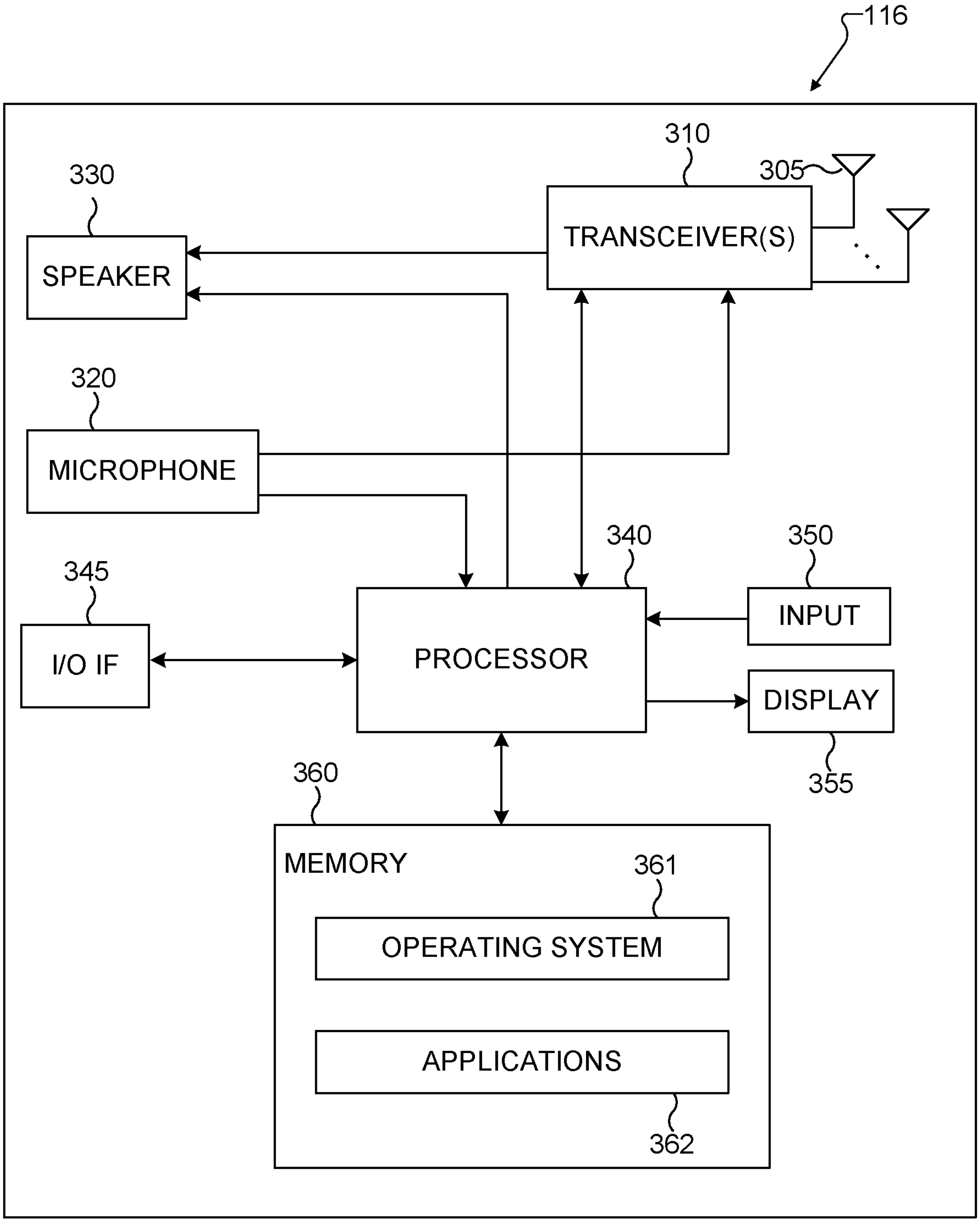
FIG. 3A illustrates an example UE according to embodiments of the present disclosure.
Figure 3B:
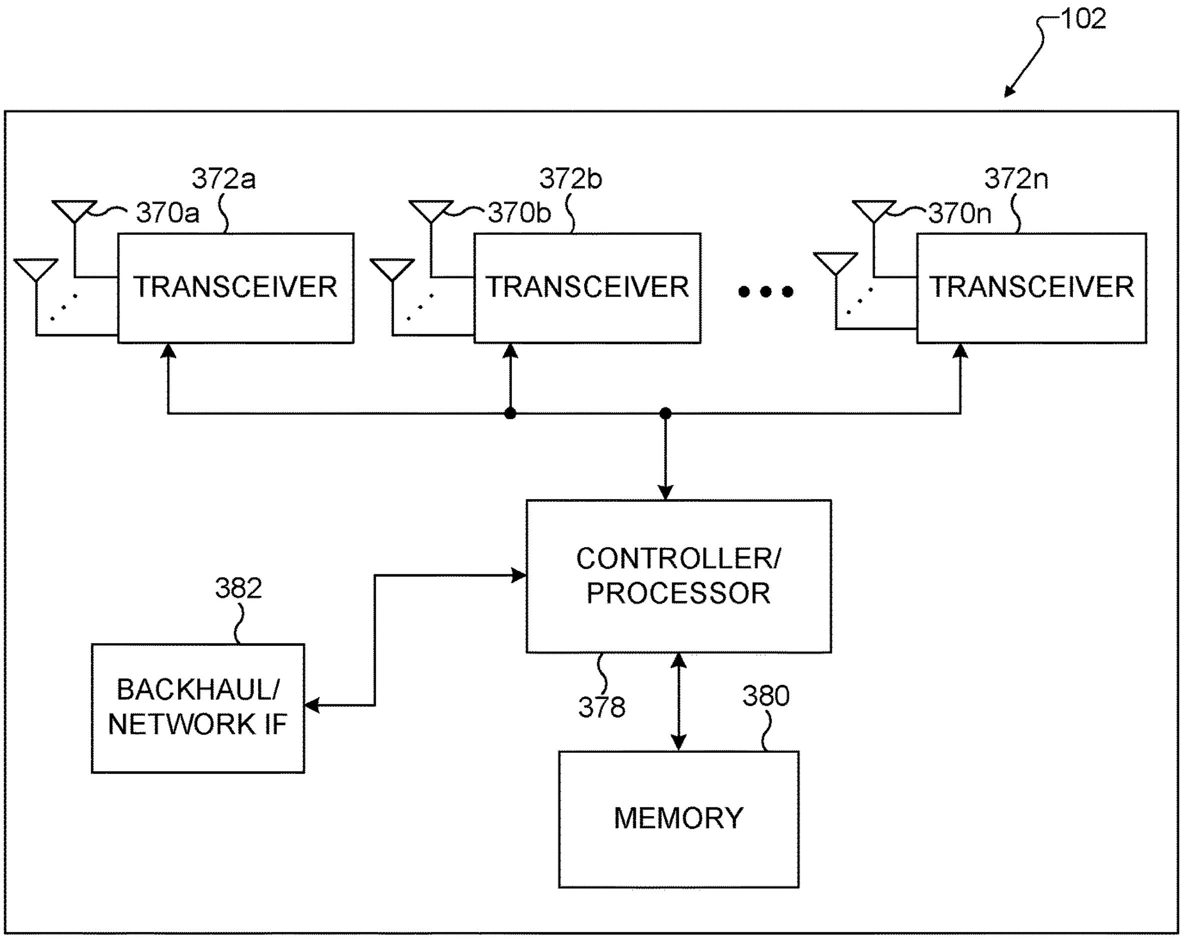
FIG. 3B illustrates an example gNB according to embodiments of the present disclosure.

FIGS. 1-3B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network

130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for LTE/NR SL coexistence. In certain embodiments, and one or more of the gNBs 101-103 includes circuitry, programing, or a combination thereof, for LTE/NR SL coexistence.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sidelink communication and/or sidelink positioning, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication and/or positioning with their other UEs (such as UEs 111A to 111C as for UE 111).

FIGS. 2A and 2B illustrate example wireless transmit and receive paths according to embodiments of the present disclosure. In the following description, a transmit path 200 may be described as being implemented in a gNB (such as gNB 102), while a receive path 250 may be described as being implemented in a UE (such as UE 116). However, it will be understood that the receive path 250 can be implemented in a gNB and that the transmit path 200 can be implemented in a UE. It may also be understood that the receive path 250 can be implemented in a first UE and that the transmit path 200 can be implemented in a second UE (or vice versa) to support SL communications. In some embodiments, the receive path 250 is configured to support LTE/NR SL coexistence as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNB s 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to gNBs 101-103 or in the sidelink to other UEs and may implement a receive path 250 for receiving in the downlink from gNBs 101-103 or in the sidelink from other UEs.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components can be added according to particular needs. Also, FIGS. 2A and 2B are meant to illustrate examples of the types of transmit and receive paths that can be used in a wireless network. Any other suitable architectures can be used to support wireless communications in a wireless network.

FIG. 3A illustrates an example UE 116 according to embodiments of the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

As shown in FIG. 3A, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL and/or SL channels and signals and the transmission of UL and/or SL channels and signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for LTE/NR SL coexistence as discussed in greater detail below. The processor 340 can move data into or out of the memory 360 as required by an executing process. In some embodiments, the processor 340 is configured to execute the applications 362 based on the OS 361 or in response to signals received from gNBs or other UEs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3A illustrates the UE 116 configured as a mobile telephone or smartphone, UEs could be configured to operate as other types of mobile or stationary devices.

FIG. 3B illustrates an example gNB 102 according to embodiments of the present disclosure. The embodiment of the gNB 102 illustrated in FIG. 3B is for illustration only, and the gNBs 101 and 103 of FIG. 1 could have the same or similar configuration. However, gNBs come in a wide variety of configurations, and FIG. 3B does not limit the scope of this disclosure to any particular implementation of a gNB.

As shown in FIG. 3B, the gNB 102 includes multiple antennas 370*a*-370*n*, multiple transceivers 372*a*-372*n*, a controller/processor 378, a memory 380, and a backhaul or network interface 382.

The transceivers 372*a*-372*n* receive, from the antennas 370*a*-370*n*, incoming RF signals, such as signals transmitted by UEs in the network 100. The transceivers 372*a*-372*n* down-convert the incoming RF signals to generate IF or baseband signals. The IF or baseband signals are processed by receive (RX) processing circuitry in the transceivers 372*a*-372*n* and/or controller/processor 378, which generates processed baseband signals by filtering, decoding, and/or digitizing the baseband or IF signals. The controller/processor 378 may further process the baseband signals.

Transmit (TX) processing circuitry in the transceivers 372*a*-372*n* and/or controller/processor 378 receives analog or digital data (such as voice data, web data, e-mail, or interactive video game data) from the controller/processor 378. The TX processing circuitry encodes, multiplexes, and/or digitizes the outgoing baseband data to generate processed baseband or IF signals. The transceivers 372*a*-372*n* up-converts the baseband or IF signals to RF signals that are transmitted via the antennas 370*a*-370*n*.

The controller/processor 378 can include one or more processors or other processing devices that control the overall operation of the gNB 102. For example, the controller/processor 378 could control the reception of UL channels and signals and the transmission of DL channels and signals by the transceivers 372*a*-372*n* in accordance with well-known principles. The controller/processor 378 could support additional functions as well, such as more advanced wireless communication functions. For instance, the controller/processor 378 could support beam forming or directional routing operations in which outgoing/incoming signals from/to multiple antennas 370*a*-370*n* are weighted differently to effectively steer the outgoing signals in a desired direction. Any of a wide variety of other functions could be supported in the gNB 102 by the controller/processor 378.

The controller/processor 378 is also capable of executing programs and other processes resident in the memory 380, such as an OS and, for example, processes to support LTE/NR SL coexistence as discussed in greater detail below. The controller/processor 225 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The interface 382 could support communications over any suitable wired or wireless connection(s). For example, when the gNB 102 is implemented as part of a cellular communication system (such as one supporting 5G/NR, LTE, or LTE-A), the interface 382 could allow the gNB 102 to communicate with other gNBs over a wired or wireless backhaul connection. When the gNB 102 is implemented as an access point, the interface 382 could allow the gNB 102 to communicate over a wired or wireless local area network or over a wired or wireless connection to a larger network (such as the Internet). The interface 382 includes any suitable structure supporting communications over a wired or wireless connection, such as an Ethernet or transceiver.

The memory 380 is coupled to the controller/processor 378. Part of the memory 380 could include a RAM, and another part of the memory 380 could include a Flash memory or other ROM.

Although FIG. 3B illustrates one example of gNB 102, various changes may be made to FIG. 3B. For example, the gNB 102 could include any number of each component shown in FIG. 3B. Also, various components in FIG. 3B could be combined, further subdivided, or omitted and additional components could be added according to particular needs.

The following documents and standards descriptions are hereby incorporated into the present disclosure as if fully set forth herein:

[1] 3 GPP TS 38.211 v17.5.0, "NR; Physical channels and modulation."
[2] 3 GPP TS 38.212 v17.5.0, "NR; Multiplexing and Channel coding."
[3] 3 GPP TS 38.213 v17.6.0, "NR; Physical Layer Procedures for Control."
[4] 3 GPP TS 38.214 v17.6.0, "NR; Physical Layer Procedures for Data."
[5] 3 GPP TS 38.321 v17.5.0, "NR; Medium Access Control (MAC) protocol specification."
[6] 3 GPP TS 38.331 v17.5.0, "NR; Radio Resource Control (RRC) Protocol Specification."
[7] 3 GPP TS 36.213 v17.5.0, "Evolved Universal Terrestrial Radio Access (E-UTRA); Physical layer procedures."
[8] RP-201385, "NR Sidelink enhancement", LG Electronics, e-meeting July 2020.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems (see also REF 1). In addition, a slot can have symbols for SL communications. A UE can be configured one or more bandwidth parts (BWPs) of a system BW for transmissions or receptions of signals or channels.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information and second stage/part SL control information (SCI), physical SL control channels (PSCCHs) conveying first stage/part SCI for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, PSFCHs can also carry conflict information, and physical SL Broadcast channel (PSBCH) conveying system information to assist in SL synchronization. SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-)configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a network can configure a UE one of two options for reporting of HARQ-ACK information by the UE:

- HARQ-ACK reporting option (1): A UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB.
- HARQ-ACK reporting option (2): A UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option (1), when a UE that transmitted the PSSCH detects a NACK in a PSFCH reception, the UE can transmit another PSSCH with the TB (retransmission of the TB). In HARQ-ACK reporting option (2) when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which belong to a sidelink resource pool can be denoted by $$\left\{t_0'^{SL}, t_1'^{SL}, t_2'^{SL}, \dots, t_{T'_{MAX}-1}'^{SL}\right\}$$

and can be configured, for example, at least using a bitmap. Where, $T'_{MAX}$ is the number of SL slots in a resource pool. Within each slot $$t_y'^{SL}$$

of a sidelink resource pool, there are $N_{subCH}$ contiguous sub-channels in the frequency domain for sidelink transmission, where $N_{subCH}$ is provided by a higher-layer parameter. Subchannel m, where m is between 0 and $N_{subCH}-1$, is given by a set of $n_{subCHsize}$ contiguous PRBs, given by $n_{PRB}=n_{subCHstart}+m\cdot n_{subCHsize}+j$, where $j=0,1, \dots, n_{subCHsize}-1$, $n_{subCHstart}$ and $n_{subCHsize}$ are provided by higher layer parameters.

For resource (re-)selection or re-evaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ contiguous subchannels x+i, where $i=0, 1, \dots, L_{subCH}-1$ in slot $$t_y^{SL}.$$

$T_1$ is determined by the UE such that, $$0 \le T_1 \le T_{proc,1}^{SL}, \text{ where } T_{proc,1}^{SL}$$

is a PSSCH processing time for example as defined in REF 4. $T_2$ is determined by the UE such that $T_{2min} \le T_2 \le$ Remaining Packet Delay Budget, as long as $t_{2min}$ < Remaining Packet Delay Budget, else $T_2$ is equal to the Remaining Packet Delay Budget. $T_{2min}$ is a configured by higher layers and depends on the priority of the SL transmission. The slots of a SL resource pool are determined as follows:

1. Let set of slots that may belong to a resource be denoted by $$\left\{t_0^{SL}, t_1^{SL}, t_2^{SL}, \dots, t_{T_{MAX}-1}^{SL}\right\},$$

where $$0 \le t_i^{SL} < 10240 \times 2^{\mu},$$

and $0 \le i < T_{max}$. μ is the sub-carrier spacing configuration. μ=0 for a 15 kHz sub-carrier spacing. μ=1 for a 30 kHz sub-carrier spacing. μ=2 for a 60 kHz sub-carrier spacing. μ=3 for a 120 kHz sub-carrier spacing. The slot index is relative to slot #0 of SFN #0 (system frame number 0) of the serving cell, or DFN #0 (direct frame number 0). The set of slots includes all slots except:

a. $N_{S\text{-}SSB}$ slots that are configured for SL SS/PBCH Block (S-SSB).

b. $N_{nonSL}$ slots where at least one SL symbol is not not-semi-statically configured as UL symbol by higher layer parameter tdd-UL-DL-ConfigurationCommon or sl-TDD-Configuration. In a SL slot, OFDM symbols Y-th, (Y+1)-th, . . . , (Y+X−1)-th are SL symbols, where Y is determined by the higher layer parameter sl-StartSymbol and X is determined by higher layer parameter sl-LengthSymbols.

c. $N_{reserved}$ reserved slots. Reserved slots are determined such that the slots in the set $$\{t_0^{SL}, t_1^{SL}, t_2^{SL}, \ldots, t_{T_{MAX}-1}^{SL}\}$$

is a multiple of the bitmap length ($L_{bitmap}$), where the bitmap ($b_0$, $b_1$, . . . , $b_{L_{bitmap}-1}$) is configured by higher layers. The reserved slots are determined as follows:

i. Let $\{l_0, l_1, \ldots, l_{2^{\mu}\times 10240-N_{S\text{-}SSB}-N_{nonSL}-1}\}$ be the set of slots in range 0 . . . $2^{\mu}\times10240-1$, excluding S-SSB slots and non-SL slots. The slots are arranged in ascending order of the slot index.

ii. The number of reserved slots is given by: $N_{reserved}=(2^{\mu}\times10240-N_{S\text{-}SSB}-N_{nonSL}) \bmod L_{bitmap}$.

iii. The reserved slots $l_r$ are given by:

$$r = \left\lfloor \frac{m \cdot (2^{\mu} \times 10240 - N_{S-SSB} - N_{nonSL})}{N_{reserved}} \right\rfloor,$$

where, m=0, 1, . . . , $N_{reserved}-1$ $T_{max}$ is given by: $T_{max}=2^{\mu}\times10240-N_{S\text{-}SSB}-N_{nonsL}-N_{reserved}$.

2. The slots are arranged in ascending order of slot index.

3. The set of slots belonging to the SL resource pool, $$\{t_0'^{SL}, t_1'^{SL}, t_2'^{SL}, \ldots, t_{T'_{MAX}-1}'^{SL}\},$$

are determined as follows:

a. Each resource pool has a corresponding bitmap ($b_0$,$b_1$, . . . , $b_{L_{bitmap}-1}$) of length $L_{bitmap}$.

b. A slot $$t_k^{SL}$$

belongs to the SL resource pool if $b_{k \bmod L_{bitmap}}=1$ c. The remaining slots are indexed successively staring from 0, 1, . . . $T'_{MAX}-1$.

Where, $T'_{MAX}$ is the number of remaining slots in the set.

Slots can be numbered (indexed) as physical slots or logical slots, wherein physical slots include all slots numbered sequential, while logical slots include only slots that can be allocated to sidelink resource pool as described above numbered sequentially. The conversion from a physical duration, $P_{rsvp}$, in milli-second to logical slots, $$P'_{rsvp},$$

is given by $$P'_{rsvp} = \left\lceil \frac{T'_{max}}{10240\text{ ms}} \times P_{rsvp} \right\rceil$$

(see section 8.1.7 of 38.214[4]).

For resource (re-)selection or re-evaluation in slot n, a UE can determine a set of available single-slot resources for transmission within a resource selection window [$n+T_1$,$n+T_2$], such that a single-slot resource for transmission, $R_{x,y}$ is defined as a set of $L_{subCH}$ contiguous subchannels s+i, where i=0, 1, . . . , $$L_{subCH} - 1 \text{ in slot } t_y^{SL}.$$

$T_1$ is determined by the UE such that, $$0 \le T_1 \le T_{proc,1}^{SL}, \text{ where } T_{proc,1}^{SL}$$

is a PSSCH processing time for example as defined in REF 4. $T_2$ is determined by the UE such that $T_{2min} \le T_2 \le$ Remaining Packet Delay Budget, as long as $T_{2min}$ < Remaining Packet Delay Budget, else $T_2$ is equal to the Remaining Packet Delay Budget. $T_{2min}$ is configured by higher layers and depends on the priority of the SL transmission.

The resource (re-)selection is a two-step procedure:

The first step (e.g., performed in the physical layer) is to identify the candidate resources within a resource selection window. Candidate resources are resources that belong to a resource pool, but exclude resources (e.g., resource exclusion) that were previously reserved, or potentially reserved by other UEs. The resources excluded are based on SCIs decoded in a sensing window and for which the UE measures a SL RSRP that exceeds a threshold. The threshold depends on the priority indicated in a SCI format and on the priority of the SL transmission. Therefore, sensing within a sensing window involves decoding the first stage SCI, and measuring the corresponding SL RSRP, wherein the SL RSRP can be based on PSCCH DMRS or PSSCH DMRS. Sensing is performed over slots where the UE doesn't transmit SL. The resources excluded are based on reserved transmissions or semi-persistent transmissions that can collide with the excluded resources or any of reserved or semi-persistent transmissions, the identified candidate resources after resource exclusion are provided to higher layers.

The second step (e.g., preformed in the higher layers) is to select or re-select a resource from the identified candidate resources.

During the first step of the resource (re-)selection procedure, a UE can monitor slots in a sensing window $[n-T_0, n-T_{proc,0})$, where the UE monitors slots belonging to a corresponding sidelink resource pool that are not used for the UE's own transmission. To determine a candidate single-slot resource set to report to higher layers, a UE excludes (e.g., resource exclusion) from the set of available single-slot resources for SL transmission within a resource pool and within a resource selection window, the following:

1. Single slot resource $R_{x,y}$, such that for any slot $$t'^{SL}_m$$

not monitored within the sensing window with a hypothetical received SCI Format 1-0, with a "Resource reservation period" set to any periodicity value allowed by a higher layer parameter reservationPeriodAllowed, and indicating all sub-channels of the resource pool in this slot, satisfies condition 2.2. below.

2. Single slot resource $R_{x,y}$, such that for any received SCI within the sensing window:
   1. The associated L1-RSRP measurement is above a (pre-)configured SL-RSRP threshold, where the SL-RSRP threshold depends on the priority indicated in the received SCI and that of the SL transmission for which resources are being selected.
   2. (Condition 2.2) The received SCI in slot $$t'^{SL}_m,$$

or if "Resource reservation field" is present in the received SCI the same SCI is assumed to be received in slot $$t'^{SL}_{m+q\times P'_{rsvp\_Rx}},$$

indicates a set of resource blocks that overlaps $R_{x,y+j\times P'_{rsvp\_Tx}}$.

Where, q=1,2, . . . , Q, where,

If $P_{rsvp\_RX} \le T_{scal}$ and $$n' - m < P'_{rsvp\_Rx} \to Q = \left\lceil \frac{T_{scal}}{P_{rsvp\_RX}} \right\rceil \cdot T_{scal}$$

is $T_2$ in units of milli-seconds.

Else Q=1

If n belongs to $$(t'^{SL}_0, t'^{SL}_1, \ldots, t'^{SL}_{T'_{max}-1}),$$

n'=n, else n' is the first slot after slot n belonging to set $$(t'^{SL}_0, t'^{SL}_1, \ldots, t'^{SL}_{T'_{max}-1}).$$

$j=0, 1, \ldots, C_{reset}-1$ $P_{rsvp\_RX}$ is the indicated resource reservation period in the received SCI in physical slots, and $$P'_{rsvp\_Rx}$$

is that value converted to logical slots.

$$P'_{rsvp\_Tx}$$

is the resource reservation period of the SL transmissions for which resources are being reserved in logical slots.

3. If the candidate resources are less than a (pre-)configured percentage, such as 20%, of the total available resources within the resource selection window, the (pre-)configured SL-RSRP thresholds are increased by a predetermined amount, such as 3 dB.

NR sidelink introduced two new procedures for mode 2 resource allocation; re-evaluation and pre-emption. Re-evaluation check occurs when a UE checks the availability of pre-selected SL resources before the resources are first signaled in an SCI Format, and if needed re-selects new SL resources. For a pre-selected resource to be first-time signaled in slot m, the UE performs a re-evaluation check at least in slot $m-T_3$. The re-evaluation check includes:

Performing the first step of the SL resource selection procedure [38.214 section 8.1.4] as aforementioned, which involves identifying a candidate (available) sidelink resource set in a resource selection window as previously described.

If the pre-selected resource is available in the candidate sidelink resource set, the resource is used/signaled for sidelink transmission.

Else, the pre-selected resource is not available in the candidate sidelink resource set, a new sidelink resource is re-selected from the candidate sidelink resource set.

Pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot $m-T_3$. When pre-emption check is enabled by higher layers, pre-emption check includes:

Performing the first step of the SL resource selection procedure [38.214 section 8.1.4] as aforementioned, which involves identifying candidate (available) sidelink resource set in a resource selection window as previously described.

If the pre-selected and reserved resource is available in the candidate sidelink resource set, the resource is used/signaled for sidelink transmission.

Else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the sidelink resource being checked for pre-emption be $P_{TX}$.

If the priority value $P_{RX}$ is less than a higher-layer configured threshold and the priority value $P_{RX}$ is less than the priority value $P_{TX}$. The pre-selected and reserved sidelink resource is pre-empted. A new sidelink resource is re-selected from the candidate sidelink resource set. Note that, a lower priority value indicates traffic of higher priority.

Else, the resource is used/signaled for sidelink transmission.

As described above, the monitoring procedure for resource (re)selection during the sensing window requires reception and decoding of a SCI format during the sensing window as well as measuring the SL RSRP. This reception and decoding process and measuring the SL RSRP increases a processing complexity and power consumption of a UE for sidelink communication and requires the UE to have receive circuitry on the SL for sensing even if the UE only transmits and does not receive on the sidelink. The aforementioned sensing procedure is referred to as full sensing.

3GPP Release 16 is the first NR release to include sidelink through work item "5G V2X with NR sidelink", the mechanisms introduced focused mainly on vehicle-to-everything (V2X), and can be used for public safety when the service requirement can be met. Release 17 extends sidelink support to more use cases through work item "NR Sidelink enhancement" (RP-201385). The objectives of Rel-17 SL include: (1) Resource allocation enhancements that reduce power consumption. (2) enhanced reliability and reduced latency.

Rel-17 introduced low-power resource allocation. Low-power resource allocation schemes include partial sensing and random resource selection. If a SL transmission from a UE is periodic, partial sensing can be based on periodic-based partial sensing (PBPS), and/or contiguous partial sensing (CPS). If a SL transmission from a UE is aperiodic, partial sensing can be based on CPS and PBPS if the resource pool supports periodic reservations (i.e., sl_multiReserveResource is enabled). When a UE performs PBPS and has periodic resource reservation, the UE selects a set of Y slots ($Y \geq Y_{min}$) within a resource selection window corresponding to PBPS, where $Y_{min}$ is provided by higher layer parameter minNumCandidateSlotsPeriodic. The UE monitors slots at $$t'^{SL}_{y-k\times P_{reserve}},$$

where $$t'^{SL}_{y}$$

a slot of the Y selected candidate slots. The periodicity value for sensing for PBPS, i.e. $P_{reserve}$ is a subset of the resource reservation periods allowed in a resource pool provided by higher layer parameter sl-ResourceReservePeriodList. $P_{reserve}$ is provided by higher layer parameter periodicSensingOccasionReservePeriodList, if not configured, $P_{reserve}$ includes all periodicities in sl-ResourceReservePeriodList. The UE monitors k sensing occasions determined by additionalPeriodicSensingOccasion, as previously described, and not earlier than $n-T_0$. For a given periodicity $P_{reserve}$, the values of k correspond to the most recent sensing occasion earlier than $$t'^{SL}_{y0} - (T^{SL}_{proc,0} + T^{SL}_{proc,1})$$

if additionalPeriodicSensingOccasion is not (pre-) configured, and additionally includes the value of k corresponding to the last periodic sensing occasion prior to the most recent one if additionalPeriodicSensingOccasion is (pre-)configured.

$$t'^{SL}_{y0}$$

is the first slot of the selected Y candidate slots of PBPS. When a UE performs CPS and doesn't have periodic resource reservation, the UE selects a set of Y' slots ($Y' \geq Y'_{min}$) within a resource selection window corresponding to CPS, where $Y_{min}$ is provided by higher layer parameter minNumCandidateSlotsAperiodic. The sensing window for CPS starts at least M logical slots before $$t'^{SL}_{y0}$$

(the first of the Y' candidate slots) and ends at $$t'^{SL}_{y0} - (T^{SL}_{proc,0} + T^{SL}_{proc,1}).$$

Rel-17 introduced inter-UE co-ordination (IUC) to enhance the reliability and reduce the latency for resource allocation, where SL UEs exchange information with one another over sidelink to aid the resource allocation mode 2 (re-)selection procedure. UE-A provides information to UE-B, and UE-B uses the provided information for its resource allocation mode 2 (re-)selection procedure. IUC is designed to address issues with distributed resource allocation such as: (1) Hidden node problem, where a UE-B is transmitting to a UE-A and UE-B can't sense or detect transmissions from a UE-C that interfere with its transmission to a UE-A, (2) Exposed node problem, where a UE-B is transmitting to a UE-A, and UE-B senses or detects transmissions from a UE-C and avoids the resources used or reserved by UE-C, but UE-C doesn't cause interference at UE-A, (3) Persistent collision problem, and (4) Half-duplex problem, where UE-B is transmitting to a UE-A in the same slot that UE-A is transmitting in, UE-A will miss the transmission from UE-B as UE-A cannot receive and transmit in the same slot.

There are two schemes for inter-UE co-ordination:

1. In one example, in scheme 1, a UE-A can provide to another UE-B indications of resources that are preferred to be included in UE-B's (re-)selected resources, or non-preferred resources to be excluded for UE-B's (re-)selected resources. When given preferred resources, UE-B may use only those resources for its resource (re-)selection, or UE-B may combine them with resources identified by its own sensing procedure, e.g., by finding the intersection of the two sets of resources, for its resource (re-)selection. When given non-preferred resources, UE-B may exclude these resources from resources identified by its own sensing procedure for its resource (re-)selection.

Transmissions of co-ordination information (e.g., IUC messages) sent by UE-A to UE-B, and co-ordination information requests (e.g., IUC requests) sent by UE-A to UE-B, are sent in a MAC-CE message and may also, if supported by the UEs, be sent in a $2^{nd}$-stage SCI Format (SCI Format 2-C). The benefit of using the 2nd stage SCI is to reduce latency. IUC messages from UE-A to UE-B can be sent standalone, or can be combined with other SL data. Coordination information (IUC messages) can be in response to a request from UE-B, or due to a condition at UE-A. An IUC request is unicast from UE-B to UE-A, in response UE-A sends an IUC message in unicast mode to UE-B. An IUC message transmitted as a result of an internal condition at UE-A can be unicast to UE-B, when the IUC message includes preferred resources, or can be unicast, groupcast or broadcast to UE-B when the IUC message includes non-preferred resources. UE-A can determine preferred or non-preferred resources for UE-B based on its own sensing taking into account the SL-RSRP measurement of the sensed data and the priority of the sensed data, i.e., the priority field of the decoded PSCCH during sensing as well as the priority the traffic transmitted by UE-B in case of request-based IUC or a configured priority in case of condition-based IUC. Non-preferred resource to UE-B can also be determined to avoid the half-duplex problem, where, UE-A can't receive data from a UE-B in the same slot UE-A is transmitting.

2. In another example, in scheme 2, a UE-A can provide to another UE-B an indication that resources reserved for UE-B's transmission, whether or not UE-A is the destination UE of these resources, are subject to conflict with a transmission from another UE. UE-A determines the conflicting resources based on the priority and RSRP of the transmissions involved in the conflict. UE-A can also determine a presence of a conflict due to the half-duplex problem, where UE-A can't receive a reserved resource from UE-B at the same time UE-A is transmitting. When UE-B receives a conflict indication for a reserved resource, UE-B can re-select new resources to replace them.

The conflict information from UE-A is sent in a PSFCH channel separately (pre-)configured from the PSFCH of the SL-HARQ operation. The timing of the PSFCH channel carrying conflict information can be based on the SCI indicating reserved resource, or based on the reserved resource.

In both schemes, UE-A can identify resources according to a number of conditions which are based on the SL-RSRP of the resources in question as a function of the traffic priority, and/or whether UE-A would be unable to receive a transmission from UE-B, due to performing its own transmission, i.e. a half-duplex problem. The purpose of this exchange of information is to give UE-B information about resource occupancy acquired by UE-A which UE-B might not be able to determine on its own due to hidden nodes, exposed nodes, persistent collisions, etc.

Release 18 considers further evolution of the NR SL air interface for operation in unlicensed bands, beam-based operation in FR2, SL carrier aggregation and co-channel co-existence between LTE SL and NR SL.

This disclosure considers dynamic co-channel co-existence between LTE SL and NR SL. The LTE SL resource and NR SL resource pool share at least some slots. There are two NR slot format types depending on whether there is a PSFCH transmission occasion or not. This is determined by higher layer parameter sl-PSFCH-Period denoted by $$N_{PSSCH}^{PSFCH}.$$

If $$N_{PSSCH}^{PSFCH}$$

equals zero, the transmission of PSFCH is disable in the resource pool. Otherwise, a UE expects that a slot $$t_k'^{SL}, \text{ where } 0 \le k < T'_{max}, \text{ with } T'_{max}$$

being the number of logical slots in the resource pool in 10240 milli-seconds, has a PSFCH transmission occasion if $$t_k'^{SL} \bmod N_{PSSCH}^{PSFCH} = 0.$$

Figure 4A:
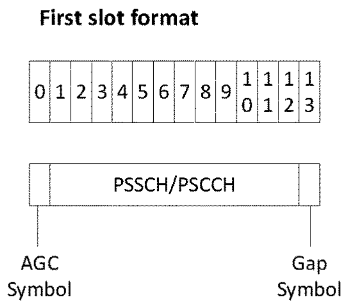
FIGS. 4A and 4B illustrate example NR SL slot formats according to embodiments of the present disclosure.
Figure 4B:
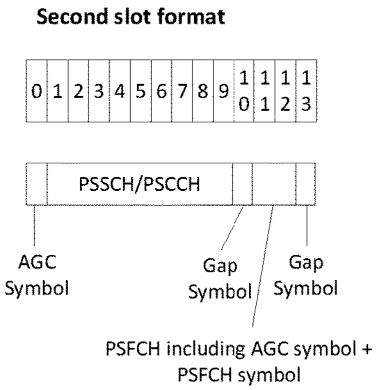

FIGS. 4A and 4B illustrate example NR SL slot formats without and with PSFCH according to embodiments of the present disclosure. The embodiments of the NR SL slot formats illustrated in FIGS. 4A and 4B are for illustration only. Different embodiments of NR SL slot formats could be used without departing from the scope of this disclosure.

In the example of FIG. 4A, the slot format is an NR SL slot that only includes PSSCH/PSCCH transmission without a PSFCH transmission occasion. In this example, all 14 symbols of the slot are allocated to SL transmission. In a variant example, less than 14 symbols can be allocated to SL transmission based on higher layer configuration as previously described. The PSSCH/PSCCH transmission extends from the second SL symbol to the second from last SL symbol. The first SL symbol is an AGC symbol, or a duplicate (repetition) of the second SL symbol (a duplicate (repetition) of the first PSSCH/PSCCH symbol). The last SL symbol is a gap symbol with no transmission.

In the example of FIG. 4B, the slot format is an NR SL slot that includes PSSCH/PSCCH and PSFCH transmission occasions. In this example, all 14 symbols of the slot are allocated to SL transmission. In a variant example, less than 14 symbols can be allocated to SL transmission based on higher layer configuration as previously described. The PSSCH/PSCCH transmission extends from the second SL symbol to the fifth from last SL symbol. The first SL symbol is an AGC symbol, or a duplicate (repetition) of the second SL symbol (a duplicate (repetition) of the first PSSCH/PSCCH symbol). The fourth from last SL symbol is a gap symbol with no transmission to separate a PSSCH/PSCCH from a PSFCH transmission occasion. This is a gap symbol between PSSCH/PSCCH and PSFCH transmission occasion. The third and second from last SL symbols are used for PSFCH transmission occasion. The third from last SL symbol is a duplicate (repetition) of the second from last SL symbol and can be consider as an AGC symbol for PSFCH. The last SL symbol is a gap symbol with no transmission.

Although FIGS. 4A and 4B illustrates examples of NR SL slot formats without and with PSFCH, various changes may be made to FIGS. 4A and 4B. For example, various changes to the symbols, the number of symbols, the symbol gaps, etc., could be made according to particular needs.

When an NR slot is configured to have a PSFCH transmission occasion, the transmission power of NR can change across the slot as described later in this disclosure. The NR slot of an NR resource pool can also be an LTE subframe of an LTE resource pool, the receive signal strength at the input of the LTE SL UE receiver changes during the LTE SL subframe. This could impact the operation of the AGC amplifier. The AGC amplifier is designed to keep the power at its output constant, hence when the signal strength (power level) at the input to the LTE SL UE receiver, or at the input to the AGC amplifier changes due to a change in power within the NR SL slot (that overlaps the LTE SL subframe), the gain of the AGC amplifier changes, if the power change is abrupt, the gain change can also be abrupt, this could impact the performance of the LTE SL reception. In this disclosure we consider methods to mitigate or eliminate the impact of power change within a slot on the LTE SL receiver.

Figure 5A:
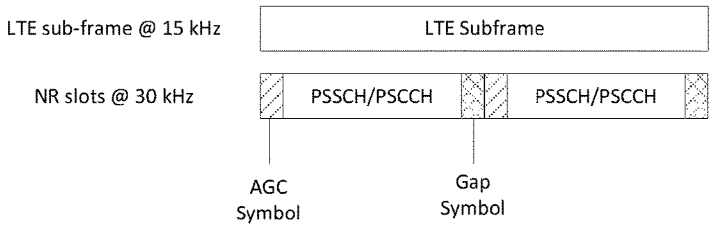
FIGS. 5A and 5B illustrate examples of LTE sub-frame overlap with NR slots according to embodiments of the present disclosure.
Figure 5B:
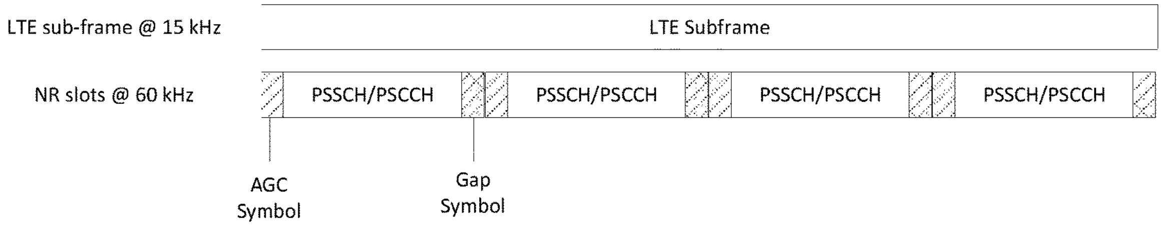

FIGS. 5A and 5B illustrate examples of LTE sub-frame overlap with NR slots with different sub-carrier spacing according to embodiments of the present disclosure. The examples of LTE sub-frame overlap with NR slots in FIGS. 5A and 5B are for illustration only. Different embodiments of LTE sub-frame overlap with NR slots could be used without departing from the scope of this disclosure.

When an NR resource pool is configured with a sub-carrier spacing of 30 kHz, and the NR resource pool overlaps with an NTE resource pool. The LTE resource pool uses a sub-carrier spacing of 15 kHz. Hence, an LTE sub-frame, overlaps with 2 NR slots at 30 kHz as illustrated in FIG. 5A. If an NR SL UE transmits in one of the slots, and not the other, or if the UE's transmit power changes between the two slots that overlap an LTE sub-frame, the receive signal strength at the input of the LTE SL UE receiver changes during the LTE SL sub-frame. This could impact the operation of the AGC amplifier. The AGC amplifier is designed to keep the power at its output constant, hence when the signal strength (power level) at the input to the LTE SL UE receiver, or at the input to the AGC amplifier changes due to a change in power within the NR SL slot (that overlaps the LTE SL slot), the gain of the AGC amplifier changes, if the power change is abrupt, the gain change can also be abrupt, this could impact the performance of the LTE SL reception.

In a further example, when an NR resource pool is configured with a sub-carrier spacing of 60 kHz, and the NR resource pool overlaps with an NTE resource pool. The LTE resource pool uses a sub-carrier spacing of 15 kHz. Hence, an LTE sub-frame, overlaps with 4 NR slots at 60 kHz as shown in FIG. 5B. If an NR SL UE transmits in some of the slots, but not some others, or if the UE's transmit power changes within the four slots that overlap an LTE sub-frame, the receive signal strength at the input of the LTE SL UE receiver changes during the LTE SL sub-frame, hence impacting AGC amplifier of the LTE SL receiver, which could impact the performance of the LTE SL reception as previously described. In general, the issue described occurs when the SCS of NR resource pool and SCS of LTE resource pool (e.g., 15 kHz) are different and the LTE subframe overlaps multiple NR slots.

Although FIGS. 5A and 5B illustrate examples of LTE sub-frame overlap with NR slots with different sub-carrier spacing, various changes may be made to FIGS. 5A and 5B. For example, various changes to the number of slots, the sub-frame frequency, the NR slots frequency, the number of symbols etc., could be made according to particular needs.

In this disclosure we consider methods to mitigate or eliminate the impact of power change within a LTE sub-frame on the LTE SL receiver.

It should be noted that it is also possible to have an LTE subframe overlap multiple NR slots (or sub-slots), when NR and LTE have a same subcarrier spacing, but the number of symbols in the LTE subframe is different from the number of symbols in the NR slot (or sub-slot). The methods presented in this disclosure to mitigate AGC impact can also apply to such cases.

3GPP Release 16 is the first NR release to include sidelink through work item "5G V2X with NR sidelink", the mechanisms introduced focused mainly on vehicle-to-everything (V2X), and can be used for public safety when the service requirement can be met. Release 17 extends sidelink support to more use cases through work item "NR Sidelink enhancement" (RP-201385). Release 18 considers further evolution of the NR SL air interface for operation in unlicensed bands, beam-based operation in FR2, SL carrier aggregation and co-channel co-existence between LTE SL and NR SL. The automotive industry has identified LTE SL/NR SL co-existence as one of the 3 top priorities for further evolution of SL. In one example, co-existence can be static or semi-static co-existence. A set of resources is allocated for LTE SL and a non-overlapping setting of resources is allocated to NR SL. Such static or semi-static allocation can lead to less efficient operation as it doesn't take into account short term variations in the LTE SL traffic and NR SL traffic, that can cause one set of resources to be lightly utilized and a second set of resources to be heavily utilized at one point in time and vice versa at a second point time. To address the inefficiencies of semi-static allocation, a more dynamic spectrum (resource) sharing approach can be considered, wherein the resources can be used by LTE SL and NR SL. Without further enhancements, this can lead to increased collisions between LTE SL traffic and NR SL traffic, leading to a higher BLER and hence reduced capacity.

One of the issues that can potentially occur is due to variation in the transmit power of the LTE SL UE within a subframe and its potential impact on the receive signal strength at the input of the LTE SL UE receiver, which could impact the AGC and hence the performance of the LTE SL reception. As described earlier, when the sub-carrier spacing of NR is different from that of LTE, an LTE subframe can overlap multiple NR slots, some of the NR slots overlapping the LTE subframe can be transmitted while other are not transmitted, or the slots are transmitted with different power levels. Consider for example, the case when NR SL has a sub-carrier spacing of 30 kHz. There are several possibilities for transmission from an NR SL UE as illustrated in FIGS. 6A-6C.

Figure 6A:
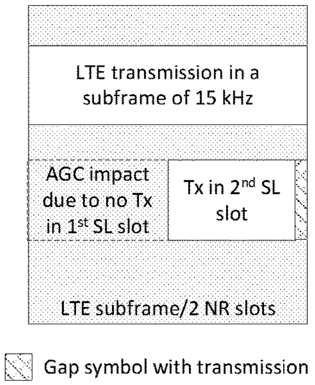
FIGS. 6A-6C illustrate examples of transmission from an NR SL UE according to embodiments of the present disclosure.
Figure 6B:
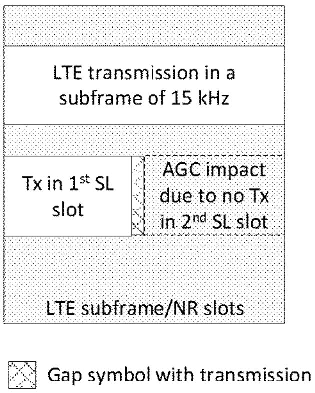
Figure 6C:
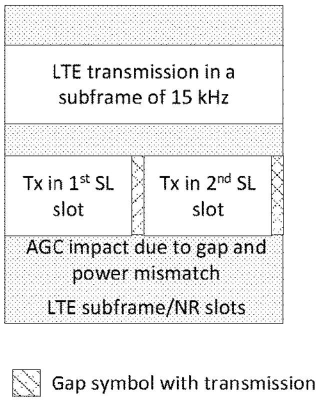

FIGS. 6A-6C illustrate examples of transmission from an NR SL UE according to embodiments of the present disclosure. The examples of transmission from an NR SL UE in FIGS. 6A-6C are for illustration only. Different embodiments of transmission from an NR SL UE could be used without departing from the scope of this disclosure.

In the example of FIG. 6A, there is no transmission from the UE in the first SL slot, but the UE transmits in the second SL slot. When the second SL slot is transmitted there could be a spike in power at the LTE SL UE receiver's input, which could impact the AGC circuitry at the LTE SL UE receiver and hence could impact performance of the LTE SL reception.

In the example of FIG. 6B, there is transmission from the UE in the first SL slot, but the UE doesn't transmit in the second SL slot. At the end of the first SL slot there could be a drop in power at the LTE SL UE receiver's input, which could impact the AGC circuitry at the LTE SL UE receiver and hence could impact performance of the LTE SL reception.

In the example of FIG. 6C, the UE transmits in both the first SL slot and the second SL slot, however there could be a change in power between the first SL slot and the second SL slot, which could impact the AGC circuitry at the LTE SL UE receiver. Even if the power of the transmission in the first SL slot and the second SL slot are the same, there is a gap symbol at the end of the first SL slot, hence there is a drop of power after the transmitting the first SL slot and before increasing again when transmitting the second SL slot. This drop and increase in transmit power could lead to a change in power level at the LTE SL UE receiver's input, which could impact the AGC circuitry at the LTE SL UE receiver and hence could impact performance of the LTE SL reception.

It should also be noted that there could be AGC impact on the LTE receiver due to change of power within an NR SL slot, when the NR SL slot includes PSSCH/PSCCH and PSFCH as illustrated in FIG. 4B.

Although FIGS. 6A-6C illustrate examples of transmission from an NR SL UE, various changes may be made to FIGS. 6A-6C. For example, various changes to the number of slots, the AGC impact, the gap symbol, etc., could be made according to particular needs.

One way to address the AGC issue at the LTE SL UE receiver's input is to configure the NR SL UE to transmit across all NR slots that overlap an LTE subframe, with the same power level. In other method is to control the ramp up and ramp down of power in slots that overlap an LTE frame. In this disclosure we propose several methods for making the transmit power from an NR SL UE constant or nearly constant during a LTE subframe.

Another one of the issues that can potentially occur is due to variation in the transmit power of the NR SL UE within a slot and its potential impact on the receive signal strength at the input of the LTE SL UE receiver, which could impact the AGC and hence the performance of the LTE SL reception. As described earlier, some NR slots can include PSFCH transmission occasions. When LTE SL and NR SL are transmitted in the same slot, and NR SL uses a slot that is configured with a PSFCH transmission occasion. There are several possibilities for transmission from an NR SL UE as illustrated in FIGS. 7A-7C.

Figure 7A:
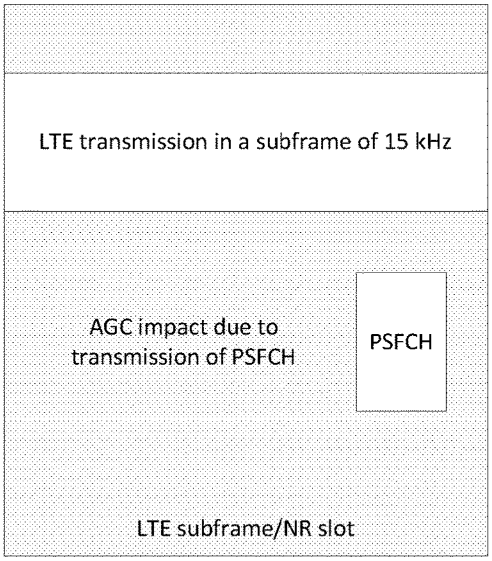
FIGS. 7A-7C illustrate examples of transmission from an NR SL UE according to embodiments of the present disclosure.
Figure 7B:
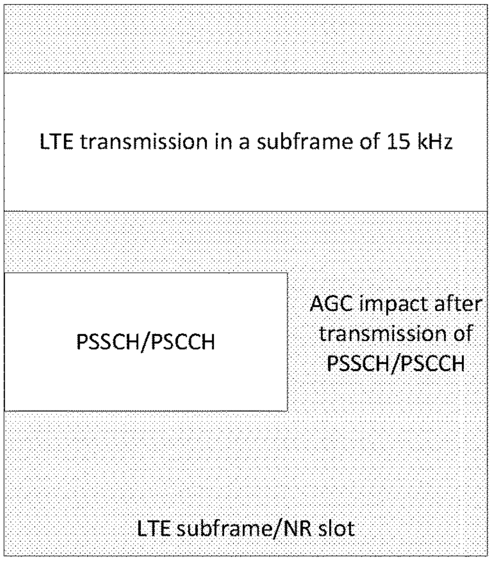
Figure 7C:
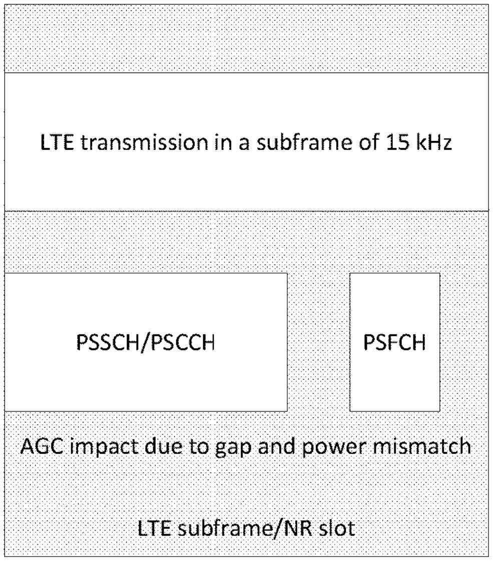

FIGS. 7A-7C illustrate examples of transmission from an NR SL UE according to embodiments of the present disclosure. The examples of transmission from an NR SL UE in FIGS. 7A-7C are for illustration only. Different embodiments of transmission from an NR SL UE could be used without departing from the scope of this disclosure.

In the example of FIG. 7A, PSFCH is transmitted by a UE, and there is no corresponding PSSCH/PSCCH transmission from the UE. When the PSFCH is transmitted there could be a spike in power at the LTE SL UE receiver's input, which could impact the AGC circuitry at the LTE SL UE receiver and hence could impact performance of the LTE SL reception.

In the example FIG. 7B, PSSCH/PSCCH is transmitted by a UE, and there is no corresponding PSFCH transmission from the UE: At the end of the PSSCH/PSCCH transmission there could be a drop in power at the LTE SL UE receiver's input, which could impact the AGC circuitry at the LTE SL UE receiver and hence could impact performance of the LTE SL reception.

In the example FIG. 7C, both PSSCH/PSCCH and PSFCH are transmitted by a UE, however there could be a change in power between PSSCH/PSCCH and PSFCH, which could impact the AGC circuitry at the LTE SL UE receiver. Even if the power of PSSCH/PSCCH and PSFCH are the same, there is a gap symbol after the PSSCH/PSCCH transmission and before the PSFCH transmission, hence there is a drop of power after the transmitting the PSSCH/PSCCH before increasing again when transmitting PSFCH. This drop and increase in transmit power could lead to a change in power level at the LTE SL UE receiver's input, which could impact the AGC circuitry at the LTE SL UE receiver and hence could impact performance of the LTE SL reception.

Although FIGS. 7A-7C illustrate examples of transmission from an NR SL UE, various changes may be made to FIGS. 7A-7C. For example, various changes to the number of slots, the AGC impact, the gap symbol, etc., could be made according to particular needs.

One way to address the AGC issue at the LTE SL UE receiver's input is to configure PSFCH transmission occasions in slots of the NR resource pool that are not used by LTE SL. Another way to address this issue is to avoid a change in power within a slot configured for PSFCH, in this disclosure we propose several methods for making the transmit power from an NR SL UE constant or nearly constant during a SL slot configured with a PSFCH transmission occasion. Another way to address this issue is to gradually ramp up or ramp down the power to avoid a sudden change in power.

In this disclosure, RRC signaling (e.g., configuration by RRC signaling) includes the following: (1) RRC signaling over the Uu interface, this can be system information block (SIB)-based RRC signaling (e.g., SIB1 or other SIB) or RRC dedicated signaling that is sent to a specific UE, and/or (2) PC5-RRC signaling over the PC5 or SL interface.

In this disclosure MAC CE signaling includes: (1) MAC CE signaling over the Uu interface, and/or (2) MAC CE signaling over the PC5 or SL interface.

In this disclosure L1 control signaling includes: (1) L1 control signaling over the Uu interface, this can include (1a) DL control information (e.g., DCI on PDCCH) and/or (1b) UL control information (e.g., UCI on PUCCH or PUSCH), and/or (2) SL control information over the PC5 or SL interface, this can include (2a) first stage sidelink control information (e.g., first stage SCI on PSCCH), and/or (2b) second stage sidelink control information (e.g., second stage SCI on PSSCH) and/or (2c) feedback control information (e.g., control information carried on PSFCH).

In some embodiments, LTE SL and NR SL can coexist. The coexistence of LTE SL and NR SL can be according to the following examples of FIGS. 8A-8C, FIG. 9, and FIGS. 10A-10F. In these examples resources refers to a time-frequency resource.

In one example, LTE SL resources and NR SL resources are not overlapping, separate resources can be used for LTE SL and separate resources can be used for NR SL. For example, the LTE SL resources and the NR SL resources can be frequency division multiplexed as illustrated in FIG. 8A, or can be time division multiplexed as illustrated in FIG. 8B, or a mixture of time and frequency division multiplexing as illustrated in FIG. 8C.

Figure 8A:
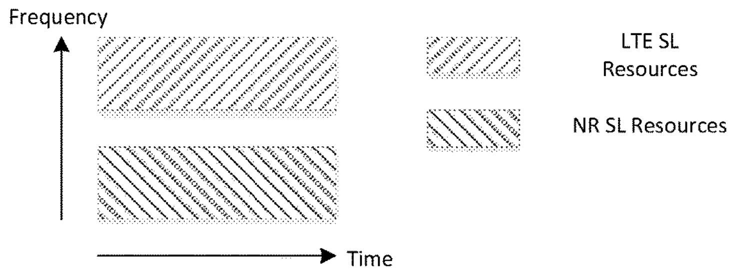
FIGS. 8A-8C illustrate examples where LTE SL resources and NR SL resources are not overlapping according to embodiments of the present disclosure.
Figure 8B:
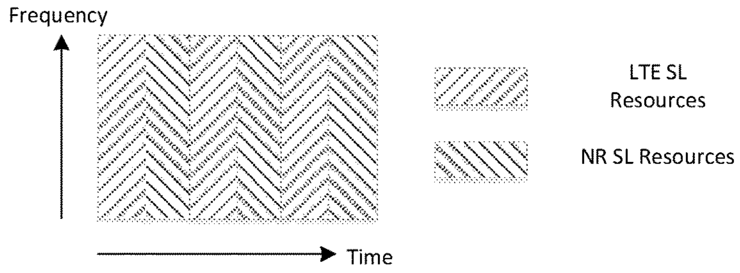
Figure 8C:
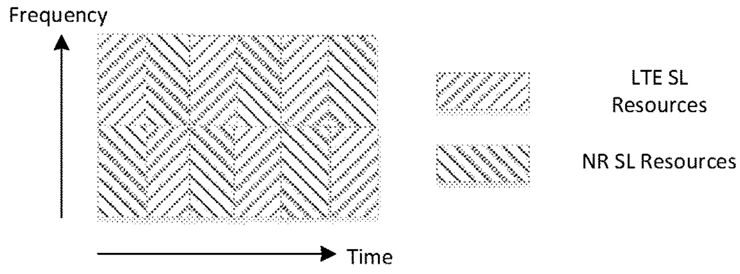

FIGS. 8A-8C illustrate examples where LTE SL resources and NR SL resources are not overlapping according to embodiments of the present disclosure. The examples where LTE SL resources and NR SL resources are not overlapping of FIGS. 8A-8C are for illustration only. Different embodiments where LTE SL resources and NR SL resources are not overlapping could be used without departing from the scope of this disclosure.

In another example, LTE SL resources and NR SL resources are fully overlapping. This is illustrated in FIG. 9.

Figure 9:
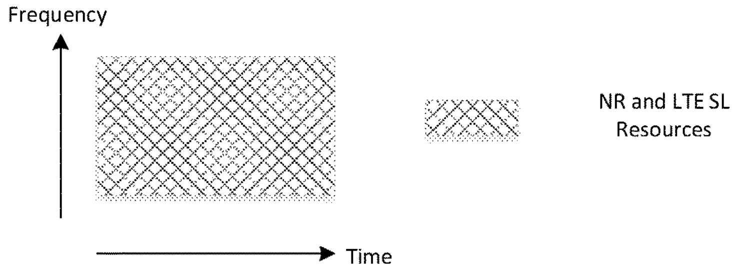
FIG. 9 illustrates an example where LTE SL resources and NR SL resources are fully overlapping according to embodiments of the present disclosure.

FIG. 9 illustrates an example where LTE SL resources and NR SL resources are fully overlapping according to embodiments of the present disclosure. The examples where LTE SL resources and NR SL resources are fully overlapping of FIG. 9 is for illustration only. Different embodiments where LTE SL resources and NR SL resources are fully overlapping could be used without departing from the scope of this disclosure.

In another example, LTE SL resources and NR SL resources are partially overlapping. This is illustrated in FIGS. 10A-10F.

FIGS. 10A-10F illustrate examples where LTE SL resources and NR SL resources are partially overlapping according to embodiments of the present disclosure. The examples where LTE SL resources and NR SL resources are partially overlapping of FIGS. 10A-10F are for illustration only. Different embodiments where LTE SL resources and NR SL resources are partially overlapping could be used without departing from the scope of this disclosure.

In one example some resources are used for LTE SL and NR SL, other resources are used for LTE SL only, while other resources are used for NR SL only. This is illustrated by way of example in FIG. 10A and FIG. 10B.

In another example some resources are used for LTE SL and NR SL and other resources are used for LTE SL only. This is illustrated by way of example in FIG. 10C and FIG. 10D.

In another example some resources are used for LTE SL and NR SL and other resources are used for NR SL only. This is illustrated by way of example in FIG. 10E and FIG. 10F.

Although FIGS. 8A-8C, FIG. 9, and FIGS. 10A-10F illustrate examples of LTE SL resource and NR SL resource overlap, various changes may be made to FIGS. 8A-8C, FIG. 9, and FIGS. 10A-10F. For example, various changes to the frequency, the time, the resources, etc., could be made according to particular needs.

In this disclosure, we consider resources shared by NR SL and LTE SL, wherein the sharing of resources between LTE SL and NR SL can be full sharing of resources or partial sharing of resources.

In one example, the resources shared by LTE and NR SL UEs can be configured to be used by one of the following:

(1) LTE SL UEs and (2) NR SL UEs that support dynamic channel co-existence with LTE SL UEs (1) LTE SL UEs and (2) any NR SL UE whether or not it supports dynamic channel co-existence with LTE SL UEs (1) LTE SL UE and (2) any NR SL UE whether or not it supports dynamic channel co-existence with LTE SL UEs. UEs that don't support dynamic channel co-existence with LTE SL UEs can only receive SL (no transmissions) on resources that are shared with LTE SL.

(1) LTE SL UE and (2) any NR SL UE whether or not it supports dynamic channel co-existence with LTE SL UEs. NR SL UEs can receive inter-UE co-ordination information that can include preferred or non-preferred resources or conflicts with respect to LTE resource reservations. UEs that don't support dynamic channel co-existence with LTE SL UEs and don't support inter-UE co-ordination information can only receive SL (no transmissions) on resources that are shared with LTE SL.

In the above, dynamic channel co-existence with LTE SL UEs can for example refer to the ability of the NR SL UE to avoid resources reserved by an LTE SL UE.

In one example, the NR SL transmissions span multiple slots. An LTE subframe overlaps N NR slots. For example, N is 2 when the NR sub-carrier spacing is 30 kHz. N is 4 when the NR sub-carrier spacing is 60 kHz. N is 8 when the NR sub-carrier spacing is 120 kHz.

FIGS. 11, 12, 13, and 14 illustrate examples of NR SL transmissions spanning multiple slots according to embodiments of the present disclosure. The examples of NR SL transmissions spanning multiple slots are for illustration only. Different embodiments of NR SL transmissions spanning multiple slots could be used without departing from the scope of this disclosure.

Figure 11:
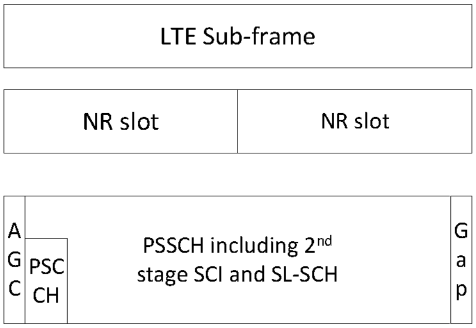
FIGS. 11, 12, 13, and 14 illustrate examples of NR SL transmissions spanning multiple slots according to embodiments of the present disclosure.

In the example illustrated in FIG. 11, the sub-carrier spacing of NR SL is 30 kHz, the sub-carrier spacing of LTE is 15 kHz, N=2, i.e., and two NR slots span an LTE sub-frame. The NR transmission spans 2 slots. The index of the first slot is denoted as 0, the index of the second slot is denoted as 1. The NR transmission comprises:

A first symbol that is a duplicate of the first PSSCH/PSCCH, also referred to as an AGC symbol.

A gap symbol at the end of slot 1 (with 30 kHz sub-carrier spacing) or in general at the end of slot N−1.

PSSCH/PSCCH transmission spanning the remaining symbols. The structure of the PSSCH/PSCCH transmissions follows that of Rel-16 as described in TS 38.211 but with more SL symbols. The PSSCH/PSCCH transmission includes (1) PSCCH with a first stage SL control information (SCI) (2) PSSCH that includes (2a) second stage SCI (2b) SL transport block provided by higher layers.

If NR has a sub-carrier spacing $15\cdot 2^{\alpha}$ kHz, where $\alpha$=0, 1, 2, 3, $N=2^{\alpha}$ and the NR transmissions spans $2^{\alpha}$ NR slots that overlap an LTE subframe.

Figure 12:
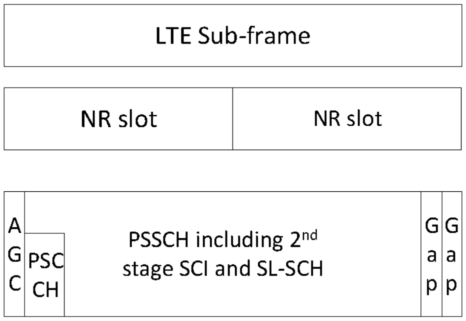

In the example illustrated in FIG. 12, the sub-carrier spacing of NR SL is 30 kHz, the sub-carrier spacing of LTE is 15 kHz, N=2, i.e., and two NR slots span an LTE sub-frame. The NR transmission spans 2 slots. The index of the first slot is denoted as 0, the index of the second slot is denoted as 1. The NR transmission comprises:

A first symbol that is a duplicate of the first PSSCH/PSCCH, also referred to as an AGC symbol.

N gap symbols at the end of slot N−1. In case of 30 kHz sub-carrier spacing, this is 2 gap symbols at the end of slot 1. The N gap symbols of NR, span one symbol of LTE.

PSSCH/PSCCH transmission spanning the remaining symbols. The structure of the PSSCH/PSCCH transmissions follows that of Rel-16 as described in TS 38.211 but with more SL symbols. The PSSCH/PSCCH transmission includes (1) PSCCH with a first stage SL control information (SCI) (2) PSSCH that includes (2a) second stage SCI (2b) SL transport block provided by higher layers.

If NR has a sub-carrier spacing $15\cdot 2^{\alpha}$ kHz, where $\alpha$=0, 1, 2, 3, $N=2^{\alpha}$ and the NR transmissions spans $2^{\alpha}$ NR slots that overlap an LTE subframe.

In a variant of the example of FIG. 12, the duplicate symbol (AGC symbol) spans N NR symbols (corresponding to 1 LTE symbol).

In one example, the N duplicate (AGC) symbols are a repetition of the first symbol of PSSCH/PSCCH N times.

In another example, the N duplicate (AGC) symbols are a repetition of the first N symbols of PSSCH/PSCCH.

Figure 13:
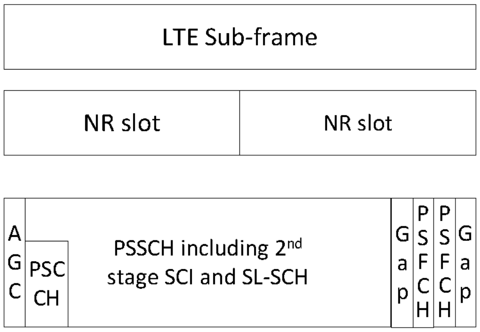

In the example illustrated in FIG. 13, the sub-carrier spacing of NR SL is 30 kHz, the sub-carrier spacing of LTE is 15 kHz, N=2, i.e., and two NR slots span an LTE sub-frame. The NR transmission spans 2 slots. The index of the first slot is denoted as 0, the index of the second slot is denoted as 1. The NR transmission comprises:

A first symbol that is a duplicate of the first PSSCH/PSCCH, also referred to as an AGC symbol.

A gap symbol at the end of slot 1 (with 30 kHz sub-carrier spacing) or in general at the end of slot N−1.

Two symbols for PSFCH before the gap symbol at the end of the slot N−1 (or slot 1 in case of 30 kHz sub-carrier spacing). The first PSFCH symbol is a duplicate symbol (AGC symbol) of the second PSFCH symbol.

A gap symbol before the PSFCH symbols. In a variant example, this gap symbol can be eliminated.

PSSCH/PSCCH transmission spanning the remaining symbols. The structure of the PSSCH/PSCCH transmissions follows the that of Rel-16 as described in TS 38.211 but with more SL symbols. The PSSCH/PSCCH transmission includes (1) PSCCH with a first stage SL control information (SCI) (2) PSSCH that includes (2a) second stage SCI (2b) SL transport block provided by higher layers.

If NR has a sub-carrier spacing $15\cdot 2^{\alpha}$ kHz, where $\alpha=0, 1, 2, 3$, $N=2^{\alpha}$ and the NR transmissions spans $2^{\alpha}$ NR slots that overlap an LTE subframe.

Figure 14:
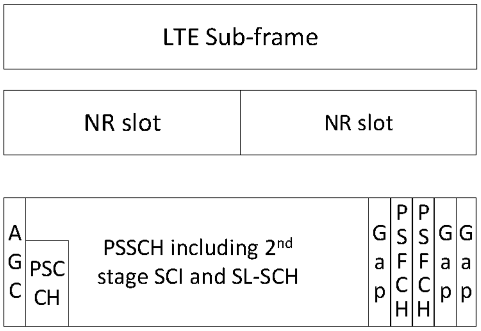

In the example illustrated in FIG. 14, the sub-carrier spacing of NR SL is 30 kHz, the sub-carrier spacing of LTE is 15 kHz, N=2, i.e., and two NR slots span an LTE sub-frame. The NR transmission spans 2 slots. The index of the first slot is denoted as 0, the index of the second slot is denoted as 1. The NR transmission comprises:

A first symbol that is a duplicate of the first PSSCH/PSCCH, also referred to as an AGC symbol.

N gap symbols at the end of slot N−1. In case of 30 kHz sub-carrier spacing, this is 2 gap symbols at the end of slot 1. The N gap symbols of NR, span one symbol of LTE.

Two symbols for PSFCH before the gap symbols at the end of the slot N−1 (or slot 1 in case of 30 kHz sub-carrier spacing). The first PSFCH symbol is a duplicate symbol (AGC symbol) of the second PSFCH symbol.

A gap symbol before the PSFCH symbols. In a variant example, this gap symbol can be eliminated.

PSSCH/PSCCH transmission spanning the remaining symbols. The structure of the PSSCH/PSCCH transmissions follows the that of Rel-16 as described in TS 38.211 but with more SL symbols. The PSSCH/PSCCH transmission includes (1) PSCCH with a first stage SL control information (SCI) (2) PSSCH that includes (2a) second stage SCI (2b) SL transport block provided by higher layers.

If NR has a sub-carrier spacing $15\cdot 2^{\alpha}$ kHz, where $\alpha=0, 1, 2, 3$, $N=2^{\alpha}$ and the NR transmissions spans $2^{\alpha}$ NR slots that overlap an LTE subframe.

In a variant of the example of FIG. 14, the duplicate symbol (AGC symbol) spans N NR symbols (corresponding to 1 LTE symbol).

In one example, the N duplicate (AGC) symbols are a repetition of the first symbol of PSSCH/PSCCH N times.

In another example, the N duplicate (AGC) symbols are a repetition of the first N symbols of PSSCH/PSCCH.

In a variant of the example of FIG. 14, the each PSFCH symbol in FIG. 14 spans N NR symbols (corresponding to 1 LTE symbol).

In a variant of the example of FIG. 14, the gap symbol between PSSCH/PSCCH and PSFCH in FIG. 14 spans N NR symbols (corresponding to 1 LTE symbol).

Although FIGS. 11, 12, 13 and 14 illustrate examples of NR SL transmissions spanning multiple slots, various changes may be made to FIGS. 11, 12, 13 and 14. For example, various changes to the slot type, slot size, number of slots, number of symbols etc. could be made according to particular needs.

In one example, if an NR SL UE transmits in a slot that overlaps an LTE sub-frame, the UE transmits in the remaining slots that overlap the LTE sub-frame. If NR has a sub-carrier spacing $15\cdot 2^{\alpha}$ kHz, where $\alpha=0, 1, 2, 3$, $N=2^{\alpha}$, each LTE sub-frame overlaps N NR slots. A UE can transmit in each of the N NR slots. For example, if the NR sub-carrier spacing is 30 kHz, N=2, the UE can transmit in the two slots that overlap LTE sub-frame. If N NR slots overlap an LTE subframe, the index of the slots is 0, 1, . . . , N−1.

In one example, the transmit power of the UE in each of the N slots that overlap the LTE subframe is the same.

In one example, the UE repeats that SL transport block in each of the N slots.

In one example, the UE can transmit new data (e.g., new SL transport block) in each of the N slots that overlap the LTE sub-frame.

In one example, the number of sub-channels used in each of the N slots that overlap the LTE sub-frame is the same.

In one example, the number of sub-channels used in each of the N slots that overlap the LTE sub-frame can be different.

In one example, the sub-channels used in each of the N slots that overlap the LTE sub-frame is the same.

In one example, the sub-channels used in each of the N slots that overlap the LTE sub-frame can be different.

In one example, the gap symbol between consecutives NR SL slots that overlap the same LTE sub-frame are eliminated as illustrated in FIGS. 15A-15D.

FIGS. 15A-15D and FIGS. 16A-16D illustrate examples where NR SL slots that overlap the same LTE sub-frame are eliminated according to embodiments of the present disclosure. The examples where NR SL slots that overlap the same LTE sub-frame are eliminated in FIGS. 15A-15D and FIGS. 16A-16D are for illustration only. Different embodiments where NR SL slots that overlap the same LTE sub-frame are eliminated could be used without departing from the scope of this disclosure.

In the examples of FIGS. 15A-15D, N SL slots overlap an LTE sub-frame, the gap symbol at the end of slot 0, slot 1, . . . slot N−2 is eliminated. The gap symbol at the end slot N−1 can remain. In another example, the gap symbol at the end of slot N−1 is also eliminated. In the examples of FIGS. 15A-15D, the sub-carrier spacing of NR SL is 30 kHz and N=2. The gap symbol at the end of slot 0 is eliminated.

Eliminating the gap slot between the slots that overlap an LTE sub-frame allows for a continuous transmission across the LTE sub-frame without a change in power.

Figure 15A:
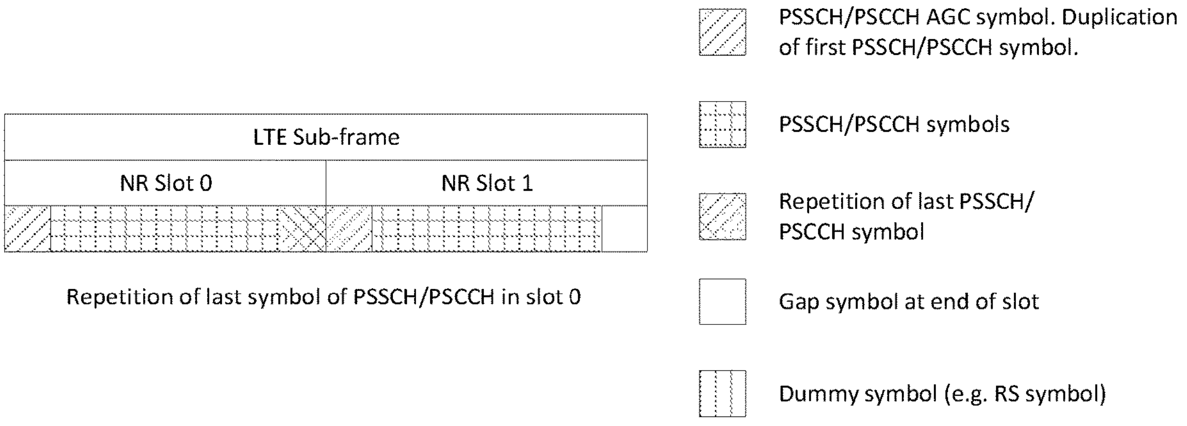
FIGS. 15A-15D and 16A-16D illustrate examples where NR SL slots that overlap the same LTE sub-frame are eliminated according to embodiments of the present disclosure.
Figure 15B:
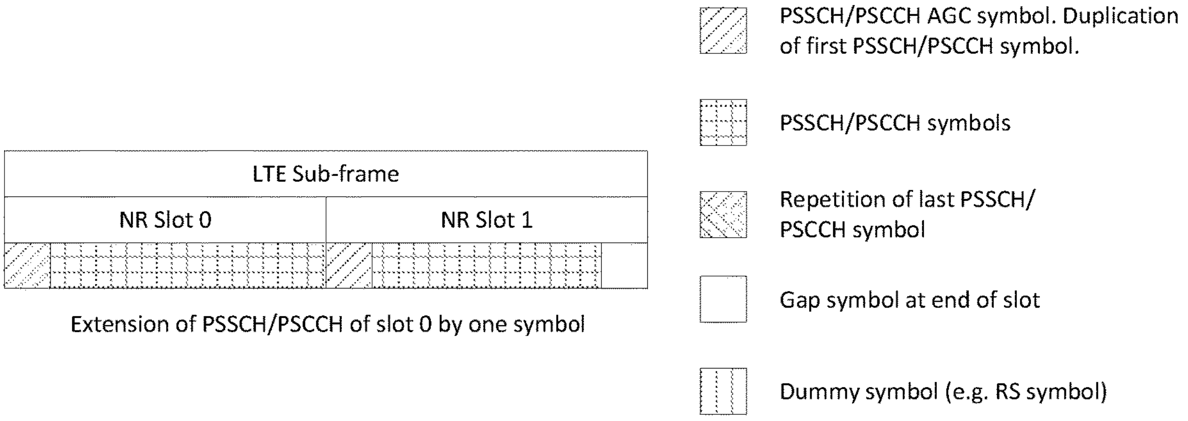
Figure 15C:
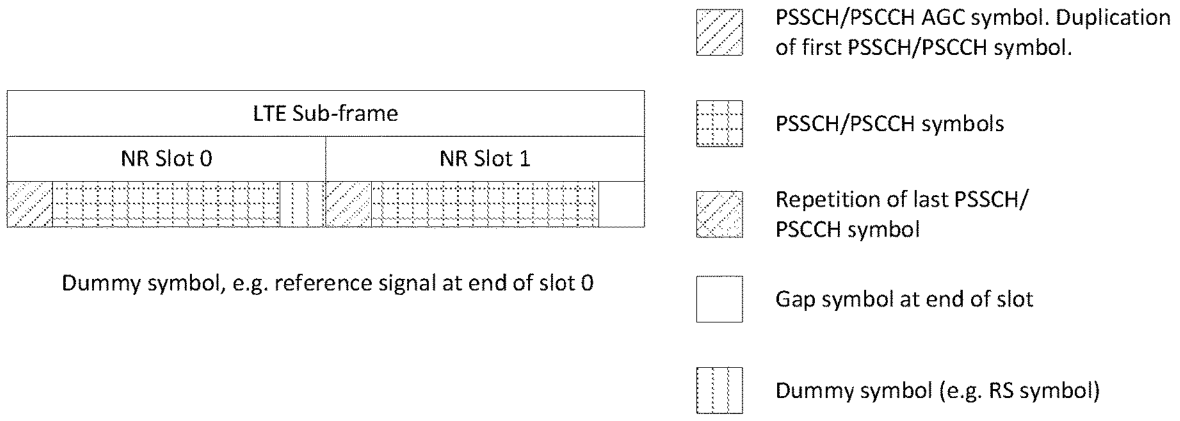
Figure 15D:
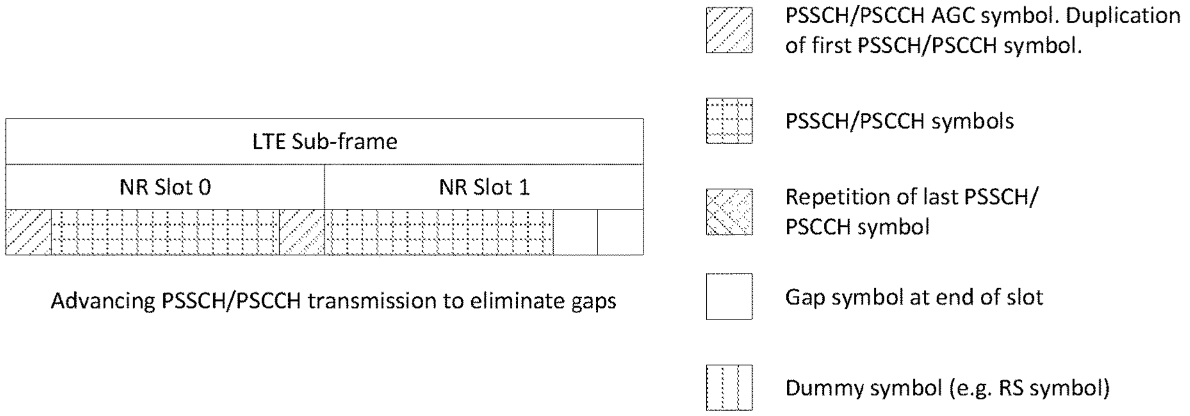
Figure 16A:
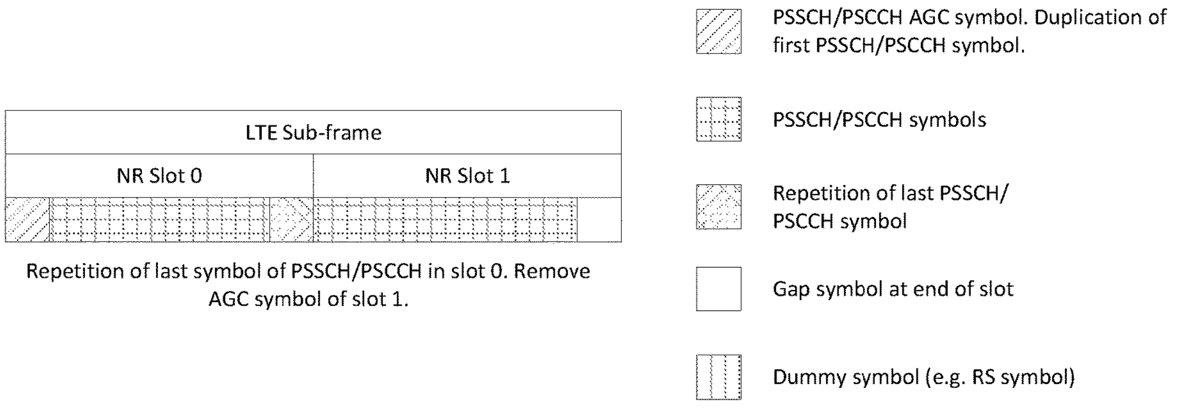
Figure 16B:
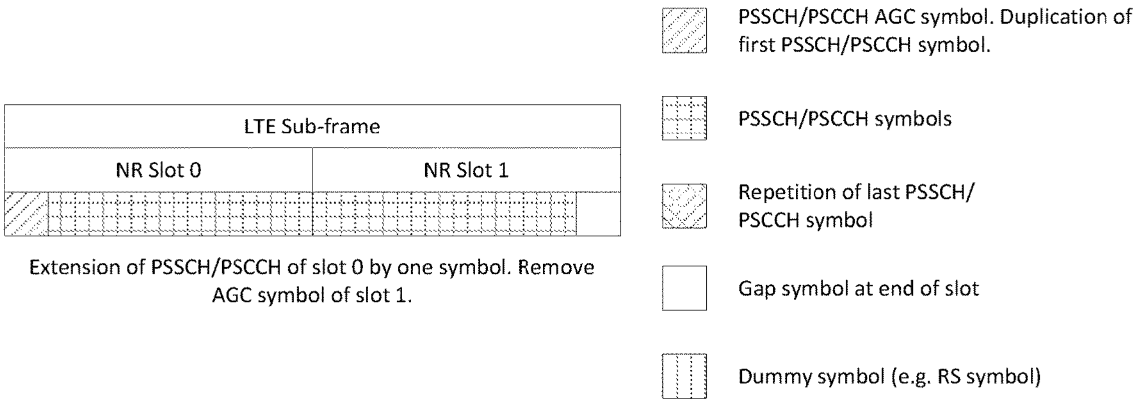
Figure 16C:
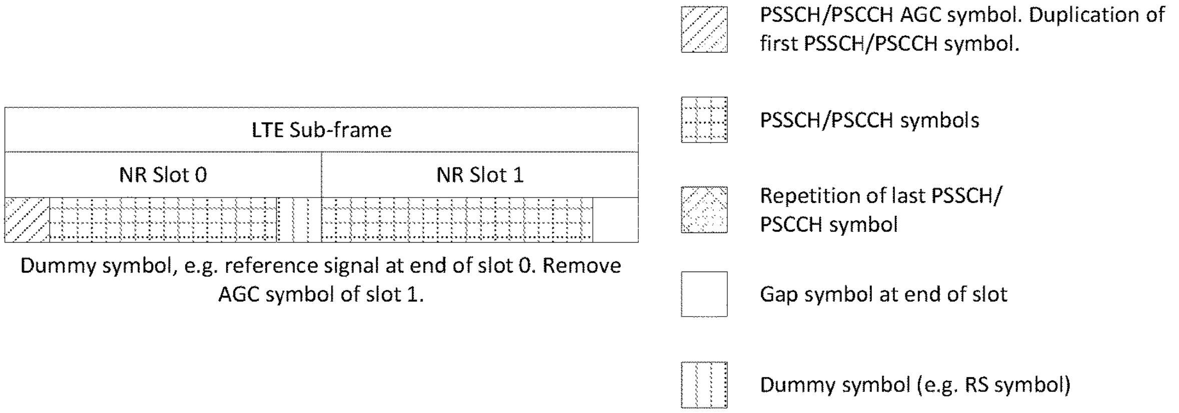
Figure 16D:
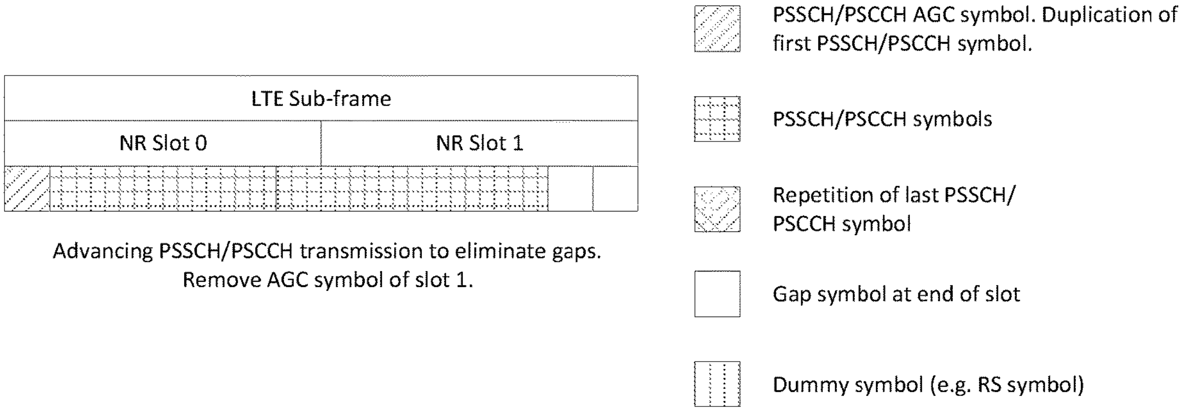

- In one example, the last PSSCH/PSCCH symbol in each of the first N−1 slots is repeated. This is illustrated in FIG. 15A.
- In one example, the PSSCH/PSCCH transmission in each of the first N−1 slots is extended by one symbol. This is illustrated in FIG. 15B.
- In one example, there is a dummy transmission (e.g., a reference signal) in the gap symbol of each of the first N−1 slots. This is illustrated in FIG. 15C.
- In one example, the transmission of each of the N slots is advanced to start just after the transmission of the previous slots ends. This is illustrated in FIG. 15D. For example, a transmission in a slot with index i is advanced i SL symbols. After the last slot that overlaps the LTE sub-frame is transmitted, there is a gap of N symbols.

In one example, the duplicate (AGC) symbol between consecutives NR SL slots that overlap the same LTE sub-frame are eliminated as illustrated in FIGS. 15A-15D. N SL slots overlap an LTE sub-frame, the duplicate (AGC) symbol at the start of slot 1, slot 2, . . . slot N−1 is eliminated. The duplicate (AGC) symbol at the start of slot 0 can remain. In another example, the duplicate (AGC) symbol at the start of slot 0 is also eliminated. In the example of FIGS. 16A-16D, the sub-carrier spacing of NR SL is 30 kHz and N=2. The duplicate (AGC) symbol at the end of slot 0 is eliminated.

Although FIGS. 15A-15D and FIGS. 16A-16D illustrate examples where NR SL slots that overlap the same LTE sub-frame are eliminated, various changes may be made to FIGS. 15A-15D and FIGS. 16A-16D. For example, various changes to the number of slots, the types of symbols, the symbol size, etc., could be made according to particular needs.

In one example, a parameter can be pre-configured or configured/updated by RRC signaling and/or MAC CE signaling and L1 control signaling. The parameter can have two states e.g., state A or state B. A state, for example, can be a parameter value or whether or not a parameter is configured.

If the parameter state is A, and e.g., if there is an LTE transmission in a sub-frame that overlaps, in time, NR slots X and X+1 (e.g., NR has SCS 30 kHz, and LTE has SCS 15 kHz), and the NR UE has data and available resources to transmit in slot X, the NR UE can transmit in slots X and X+1.

- In one example, the power of the SL transmission in slot X equals the power of the SL transmission in slot X+1.
- In one example, the power of the SL transmission in slot X equals or is greater than the power of the SL transmission in slot X+1.
- In one example, there is a gap symbol at the end of slot X and X+1 (e.g., symbol with no transmission).
- In one example, there is no gap symbol at the end of slot X as aforementioned.
- In one example, a SL transmission in slot X is at least PSSCH/PSCCH (the first symbol of slot X has a transmission)
- In one example, a SL transmission in slot X+1 can be PSSCH/PSCCH and/or PSFCH.

If the parameter state is A, and e.g., if there is an LTE transmission in a sub-frame that overlaps, in time, NR slots X, X+1, X+2, . . . , X+N−1, and the NR UE has data and available resources to transmit in slot X, the NR UE can transmit in slots X, X+1, X+N−1.

- In one example, the power of the SL transmission in slot X equals the power of the SL transmission in slots X+1, X+2, . . . , X+N−1.
- In one example, the power of the SL transmission in slot X equals or is greater than the power of the SL transmission in slots X+1, X+2, . . . , X+N−1.
- In one example, there is a gap symbol at the end of slots X, X+1, . . . , X+N−1 (e.g., symbol with no transmission).
- In one example, there is no gap symbol at the end of slots X, X+1, . . . , X+N−2 as aforementioned.
- In one example, a SL transmission in slot X is at least PSSCH/PSCCH (the first symbol of slot X has a transmission)
- In one example, a SL transmission in slots X+1, X+2, . . . , X+N−1 can be PSSCH/PSCCH and/or PSFCH.

If the parameter state is B, and e.g., if there is an LTE transmission in a sub-frame that overlaps, in time, NR slots X and X+1 (e.g., NR has SCS 30 kHz, and LTE has SCS 15 kHz), and the NR UE has data and available resources to transmit in slot X, the NR UE can transmit at least in slot X.

- In one example, there is no transmission in slot X+1.
- In one example, if there is a transmission in slot X+1, the power of the SL transmission in slot X equals the power of the SL transmission in slot X+1.
- In one example, if there is a transmission in slot X+1, the power of the SL transmission in slot X equals or is greater than the power of the SL transmission in slot X+1.
- In one example, there is a gap symbol at the end of slot X (e.g., symbol with no transmission).
- In one example, there is no gap symbol at the end of slot X as aforementioned.
- In one example, a SL transmission in slot X is at least PSSCH/PSCCH (the first symbol of slot X has a transmission)
- In one example, if there is a transmission in slot X+1, the SL transmission can be PSSCH/PSCCH and/or PSFCH.

If the parameter state is B, and e.g., if there is an LTE transmission in a sub-frame that overlaps, in time, NR slots X, X+1, X+2, . . . , X+N−1, and the NR UE has data and available resources to transmit in slot X, the NR UE can transmit at least in slot X.

- In one example, there is no transmission in slots X+1, X+2, . . . , X+N−1.
- In one example, if there is a transmission in one or more of slots X+1, X+2, . . . , X+N−1, the power of the SL transmission in slot X equals the power of the SL transmission in slots X+1, X+2, . . . , X+N−1 where there is a transmission.
- In one example, if there is a transmission in one or more of slots X+1, X+2, . . . , X+N−1, the power of the SL transmission in slot X equals or is greater than the power of the SL transmission in slot X+1, X+2, . . . , X+N−1 where there is a transmission.
- In one example, there is a gap symbol at the end of slots X, X+1, . . . , X+N−1 (e.g., symbol with no transmission).
- In one example, there is no gap symbol at the end of slots X, X+1, . . . , X+N−2 as aforementioned.
- In one example, a SL transmission in slot X is at least PSSCH/PSCCH (the first symbol of slot X has a transmission)

In one example, if there is a transmission in one or more of slots X+1, X+2, . . . , X+N−1, the SL transmission can be PSSCH/PSCCH and/or PSFCH in a slot with a SL transmission.

In one example, when the UE transmits PSSCH/PSCCH in a slot and doesn't transmit PSSCH/PSCCH in the following slot and both slots overlap an LTE sub-frame, the power is ramped down towards the end of the PSSCH/PSCCH transmission of the first (earlier) slot.

In one example, the ramping down of power is done continuously across one or more symbols.

In one example, the ramping down of power is done symbol-wise e.g., the power is constant within one symbol, but the power of adjacent symbols can be different.

In one example, the ramping down of power is done symbol-group-wise e.g., the power is constant within one symbol-group, but the power of adjacent symbol groups can be different.

FIGS. 17A-17E illustrate examples of power ramping down according to embodiments of the present disclosure. The examples of power ramping down n FIGS. 17A-17E are for illustration only. Different embodiments of power ramping down could be used without departing from the scope of this disclosure.

Figure 17A:
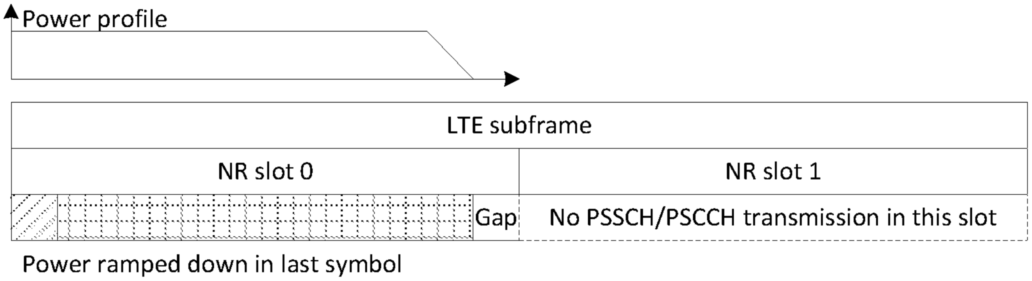
FIGS. 17A-17E illustrate examples of power ramping down according to embodiments of the present disclosure.

In the example illustrated if FIG. 17A, the ramping down of power is done continuously across the last symbol of PSSCH/PSCCH of the first slot.

Figure 17B:
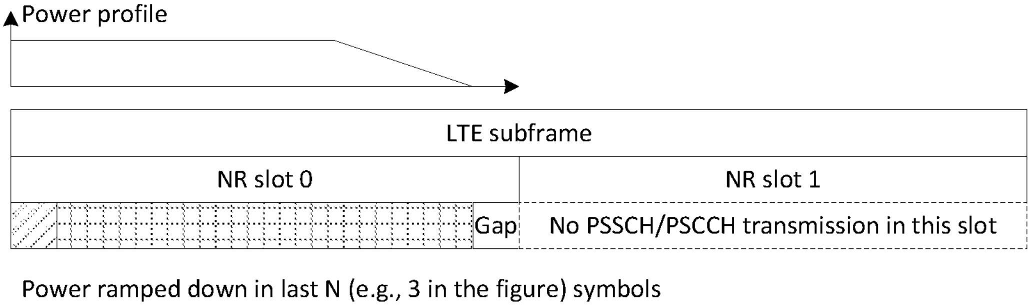

In the example illustrated in FIG. 17B, the ramping down of power is done continuously across the last N symbol of PSSCH/PSCCH of the first slot. In one example, N can be specified in the system specifications and/or pre-configured and/or configured by higher layer RRC signaling and/or configured by MAC CE and/or DCI. In one example, if N is not pre-configured or configured by RRC signaling or configured by MAC CE or DCI a value specified in the system specifications is used.

Figure 17C:
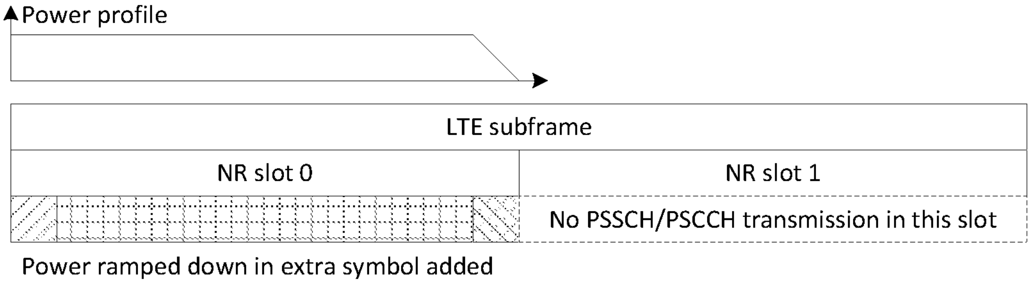

In the example illustrated in FIG. 17C, an extra symbol is added after the PSSCH/PSCCH of the first slot as described herein (e.g., a repetition of the last symbol of PSSCH/PSCCH or extension of PSSCH/PSCCH by one symbol or dummy symbol). In this example, the ramping down of power is done continuously across the added symbol.

Figure 17D:
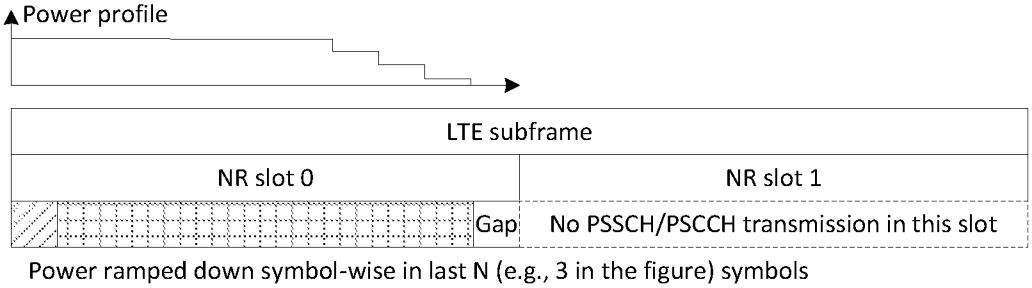

In the example illustrated in FIG. 17D, the ramping down of power is done symbol-wise across the last N symbol of PSSCH/PSCCH of the first slot. In one example, N can be specified in the system specifications and/or pre-configured and/or configured by higher layer RRC signaling and/or configured by MAC CE and/or DCI. In one example, if N is not pre-configured or configured by RRC signaling or configured by MAC CE or DCI a value specified in the system specifications is used. In one example N=1.

Figure 17E:
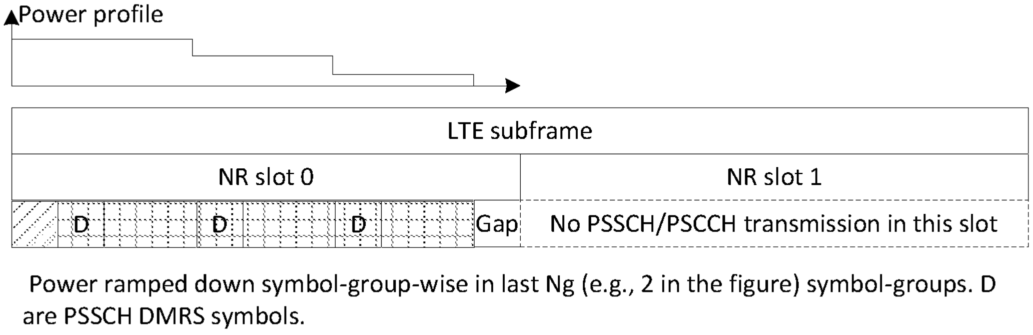

In the example illustrated in FIG. 17E, the ramping down of power is done symbol-group-wise across the last N symbols (or N symbol groups) of PSSCH/PSCCH of the first slot. In one example, N (or Ng) can be specified in the system specifications and/or pre-configured and/or configured by higher layer RRC signaling and/or configured by MAC CE and/or DCI. In one example, if N (or Ng) is not pre-configured or configured by RRC signaling or configured by MAC CE or DCI a value specified in the system specifications is used. In one example Ng=1. In one example, a group of symbols includes a PSSCH DMRS symbol.

Although FIGS. 17A-17E illustrate examples of power ramping down, various changes may be made to FIGS. 17A-17E. For example, various changes to the number of slots, the symbol types, the power profile, etc., could be made according to particular needs.

In one example, when the UE doesn't transmit PSSCH/PSCCH in a slot but transmits PSSCH/PSCCH in the following slot and both slots overlap an LTE sub-frame, the power is ramped up towards the start of the PSSCH/PSCCH transmission of the second (later) slot.

In one example, the ramping up of power is done continuously across one or more symbols.

In one example, the ramping up of power is done symbol-wise e.g., the power is constant within one symbol, but the power of adjacent symbols can be different.

In one example, the ramping up of power is done symbol-group-wise e.g., the power is constant within one symbol-group, but the power of adjacent symbol groups can be different.

FIGS. 18A-18E illustrate examples of power ramping up according to embodiments of the present disclosure. The examples of power ramping up n FIGS. 18A-18E are for illustration only. Different embodiments of power ramping up could be used without departing from the scope of this disclosure.

Figure 18A:
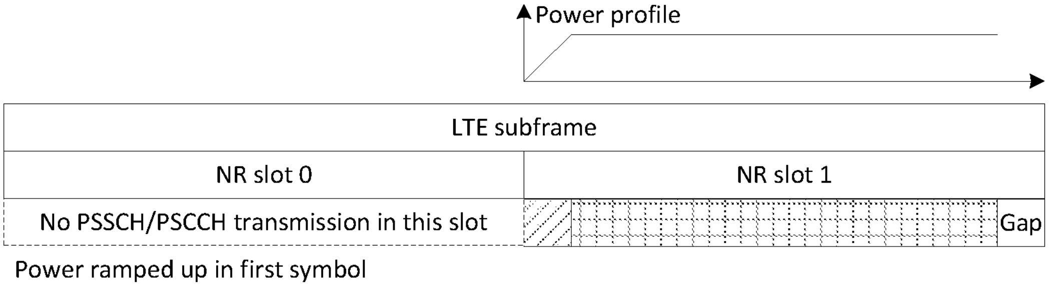
FIGS. 18A-18E illustrate examples of power ramping up according to embodiments of the present disclosure.

In the example illustrated in FIG. 18A, the ramping up of power is done continuously across the first symbol of PSSCH/PSCCH (i.e., the AGC or duplicate symbol of the second slot.

Figure 18B:
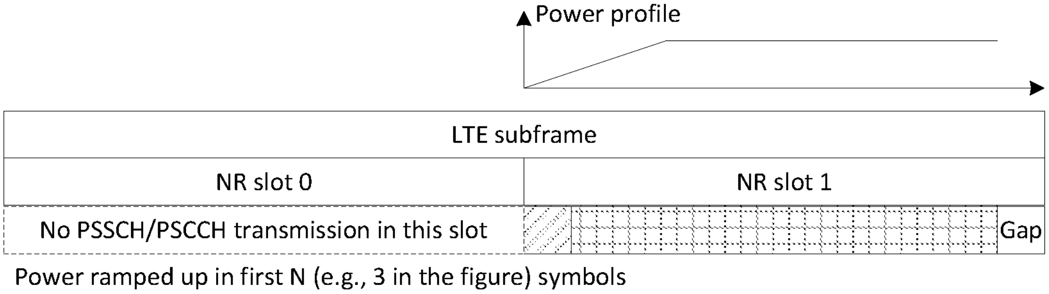

In the example illustrated in FIG. 18B, the ramping up of power is done continuously across the first N symbol of PSSCH/PSCCH of the second slot. In one example, N can be specified in the system specifications and/or pre-configured and/or configured by higher layer RRC signaling and/or configured by MAC CE and/or DCI. In one example, if N is not pre-configured or configured by RRC signaling or configured by MAC CE or DCI a value specified in the system specifications is used.

Figure 18C:
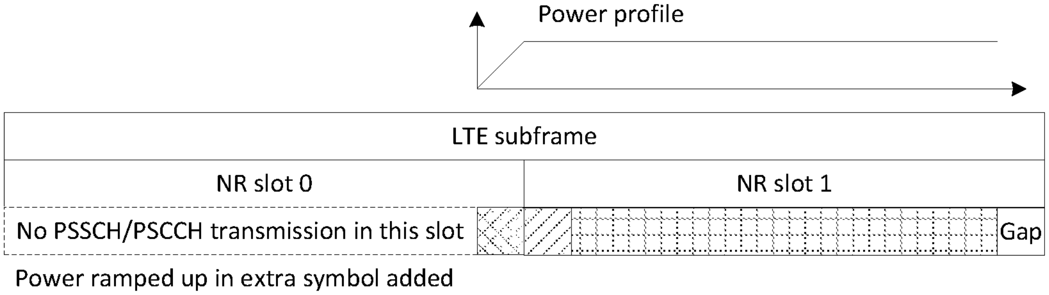

In the example illustrated in FIG. 18C, an extra symbol is added before the PSSCH/PSCCH transmission of the second slot as described herein. In this example, the ramping up of power is done continuously across the added symbol.

Figure 18D:
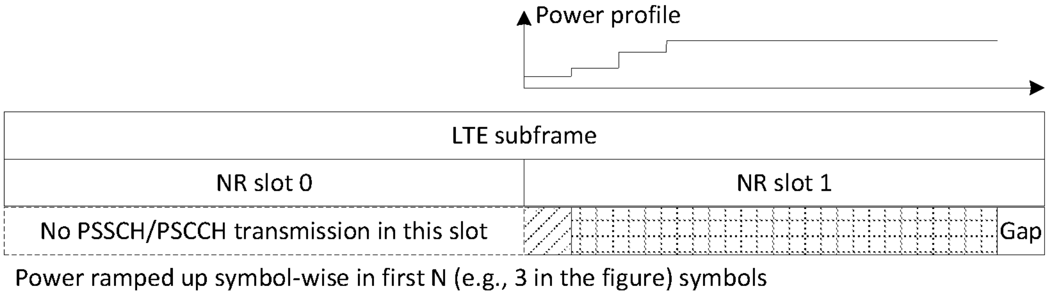

In the example illustrated in FIG. 18D, the ramping up of power is done symbol-wise across the first N symbol of PSSCH/PSCCH of the second slot. In one example, N can be specified in the system specifications and/or pre-configured and/or configured by higher layer RRC signaling and/or configured by MAC CE and/or DCI. In one example, if N is not pre-configured or configured by RRC signaling or configured by MAC CE or DCI a value specified in the system specifications is used. In one example N=1.

Figure 18E:
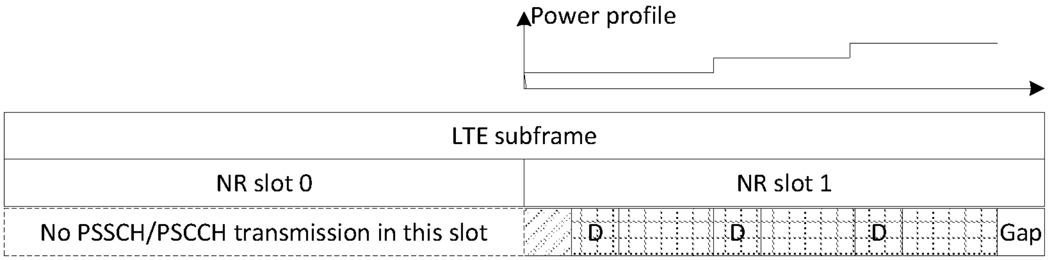

In the example illustrated in FIG. 18E, the ramping up of power is done symbol-group-wise across the first N symbols (or N symbol groups) of PSSCH/PSCCH of the second slot. In one example, N (or Ng) can be specified in the system specifications and/or pre-configured and/or configured by higher layer RRC signaling and/or configured by MAC CE and/or DCI. In one example, if N (or Ng) is not pre-configured or configured by RRC signaling or configured by MAC CE or DCI a value specified in the system specifications is used. In one example Ng=1. In one example, a group of symbols includes a PSSCH DMRS symbol.

In one example, when the UE doesn't transmit PS SCH/PSCCH in a slot but transmits PSSCH/PSCCH in the following slot and both slots overlap an LTE sub-frame, the power is ramped up towards the start of the PSSCH/PSCCH transmission of the second (later) slot.

In one example, if a UE transmits PSSCH/PSCCH in a (first) slot and transmits PSSCH/PSCCH in the following (second) slot and both slots overlap an LTE sub-frame. The PSSCH/PSCCH of the first slot and the PSSCH/PSCCH of the second slot are transmitted with the same power, and a signal is transmitted in the gap between the PSSCH/PSCCH of the first slot and the PSSCH/PSCCH of the second slot as described herein. In this case, there is no ramp down or ramp up of power.

In one example, if a UE transmits PSSCH/PSCCH in a (first) slot and transmits PSSCH/PSCCH in the following (second) slot and both slots overlap an LTE sub-frame, and there is gap between the PSSCH/PSCCH of the first slot and the PSSCH/PSCCH of the second slot. The PSSCH/PSCCH power is ramped down towards the end first slot as described earlier, the PSSCH/PSCCH power is ramped up towards the start of the PSSCH/PSCCH of the second slot as described earlier.

In one example, when the UE transmits PSSCH/PSCCH in a (first) slot but doesn't transmit PSSCH/PSCCH in the following (second) slot and both slots overlap an LTE sub-frame, the power is ramped down towards the end of the PSSCH/PSCCH transmission of the first slot as described earlier.

In one example, when the UE transmits PSSCH/PSCCH in a (second) slot but doesn't transmit PSSCH/PSCCH in the previous (first) slot and both slots overlap an LTE sub-frame, the power is ramped up towards the start of the PSSCH/PSCCH transmission of the second slot as described earlier.

Although FIGS. 18A-18E illustrate examples of power ramping up, various changes may be made to FIGS. 18A-18E. For example, various changes to the number of slots, the symbol types, the power profile, etc., could be made according to particular needs.

Figure 10A:
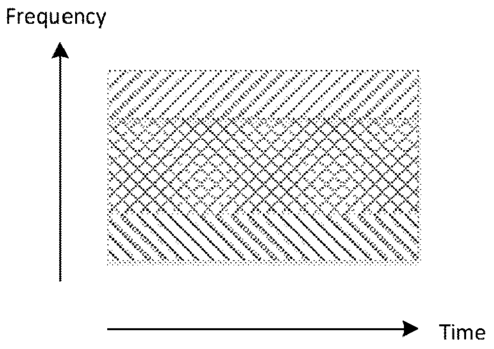
FIGS. 10A-10F illustrate examples where LTE SL resources and NR SL resources are partially overlapping according to embodiments of the present disclosure.
Figure 10B:
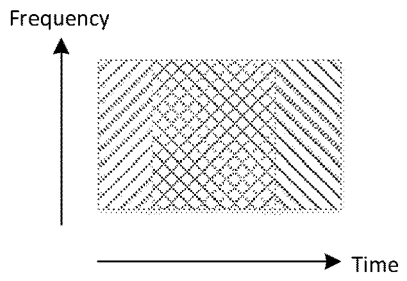
Figure 10C:
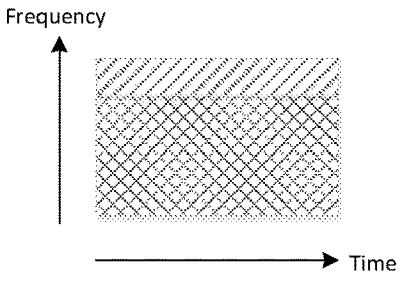
Figure 10D:
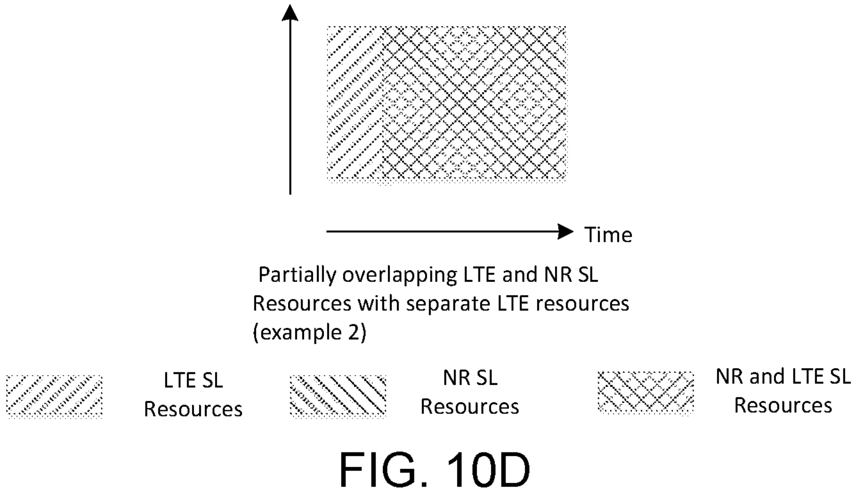
Figure 10E:
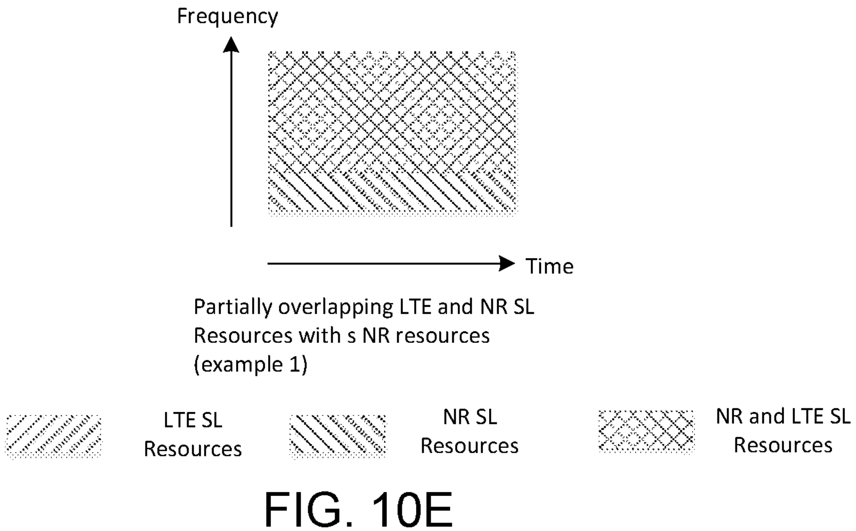

In one example, the slots of the NR resource pool and the slots of the LTE resource pool partially overlap, as illustrated in FIG. 10B, the slots that are common for LTE Resource pool and the NR resource pool have NR SL slots that are not configured with PSFCH transmission occasions. The slots used for only the NR resource pool (and not the LTE resource pool) can be configured with PSFCH transmission occasions.

FIGS. 19, 20, 21, and 22 illustrate examples where slots used for only the NR resource pool can be configured with PSFCH transmission occasions according to embodiments of the present disclosure. The examples where slots used for only the NR resource pool can be configured with PSFCH transmission occasions in FIGS. 19, 20, 21, and 22 are for illustration only. Different embodiments where slots used for only the NR resource pool can be configured with PSFCH transmission occasions could be used without departing from the scope of this disclosure.

Figure 19:
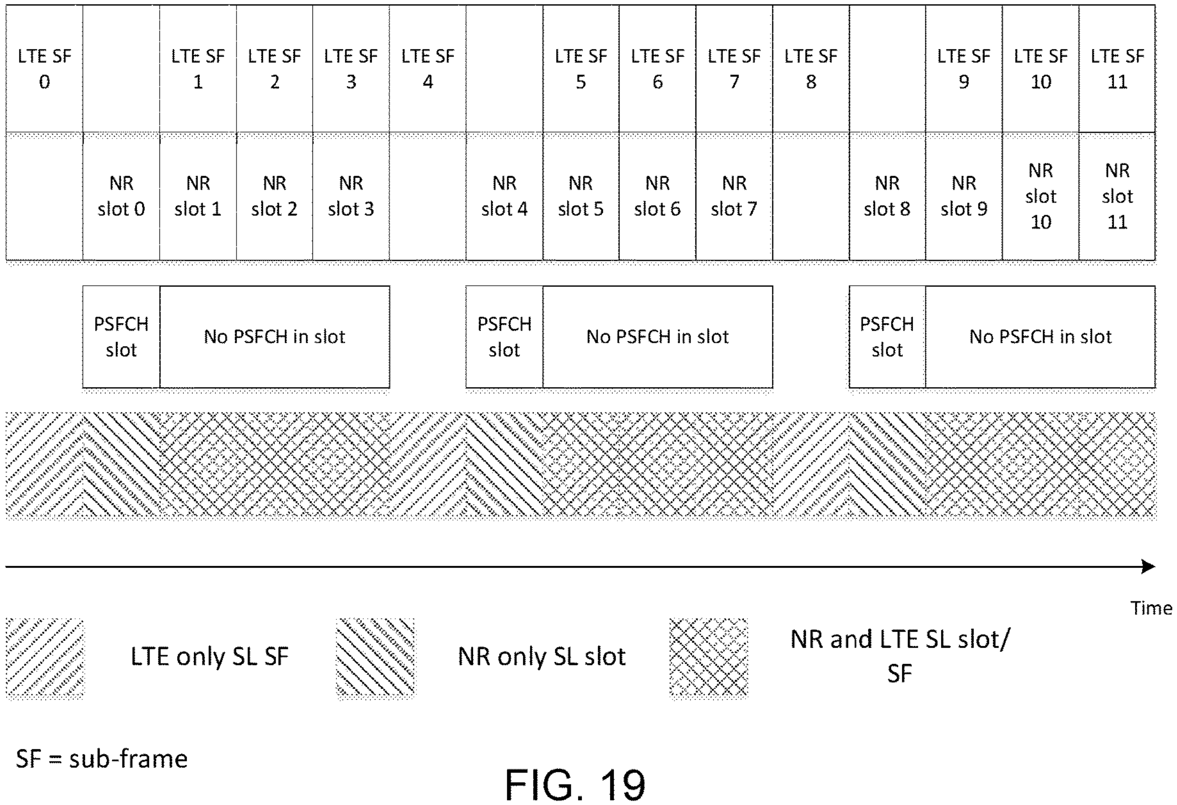
FIGS. 19, 20, 21, and 22 illustrate examples where slots used for only the NR resource pool can be configured with PSFCH transmission occasions according to embodiments of the present disclosure.

FIG. 19 illustrates an example, with $$N_{PSSCH}^{PSFCH} = 4$$

for every four slots in the NR resource pool, there is one slot that has PSFCH transmission occasion. The slot that has PSFCH transmission occasion is not in the LTE resource pool. The three slots that don't have a PSFCH transmission occasion are in the LTE resource pool. There are other slots that are in the LTE resource pool, but not in the NR resource pool. In this example, slots that have PSFCH occasions are only in the NR resource pool. Slots that don't have PSFCH occasions are shared between the NR resource pool and the LTE resource pool.

Figure 20:
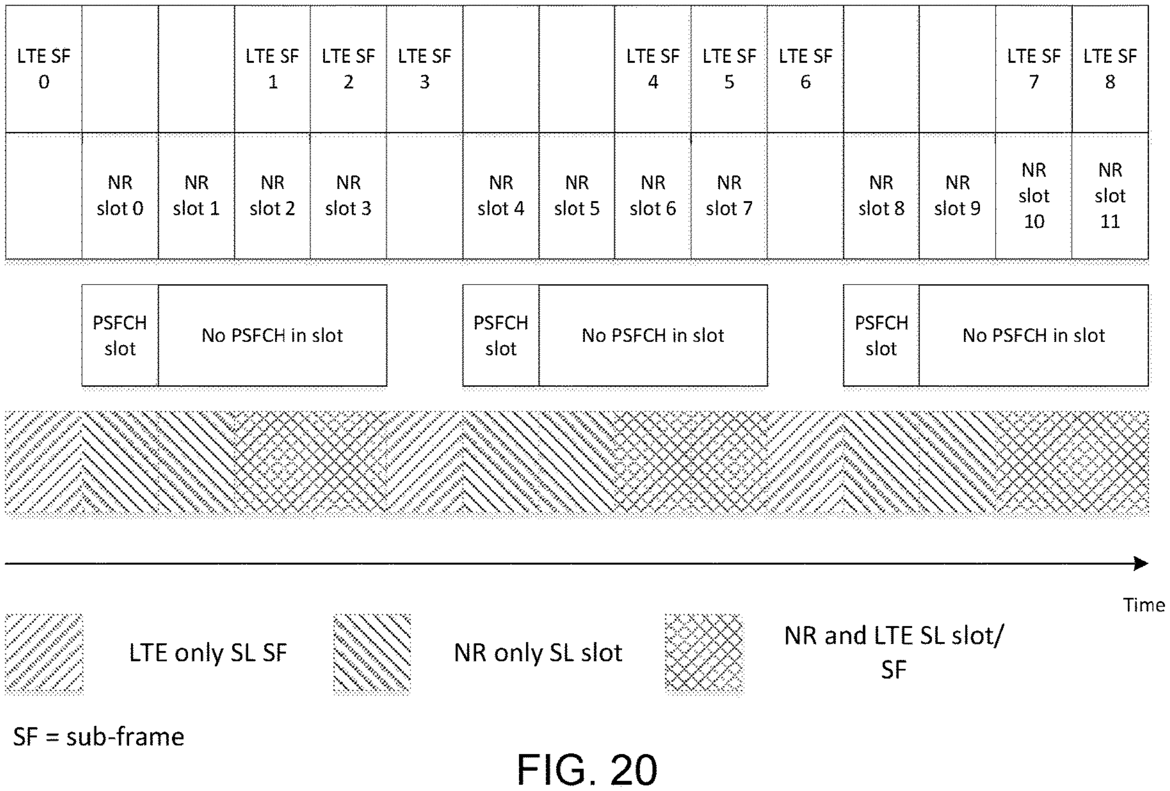

FIG. 20 illustrates another example, with $$N_{PSSCH}^{PSFCH} = 4$$

for every four slots in the NR resource pool, there is one slot that has PSFCH transmission occasion. The slot that has PSFCH transmission occasion is not in the LTE resource pool. Two of the three slots that don't have a PSFCH transmission occasion are in the LTE resource pool, the third slot that doesn't have a PSFCH transmission occasion is not in the LTE resource pool. There are other slots that are in the LTE resource pool, but not in the NR resource pool. In this example, slots that have PSFCH occasions are only in the NR resource pool. Slots that don't have PSFCH occasions are either in the NR resource pool or shared between the NR resource pool and the LTE resource pool.

Figure 10F:
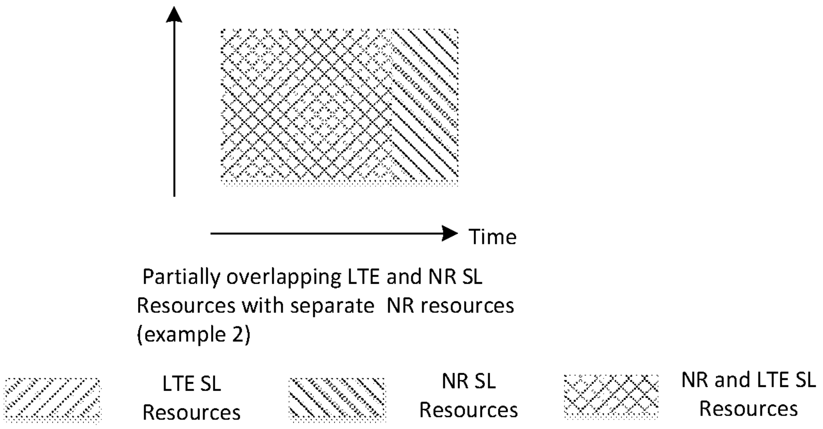

In one example, the slots of the NR resource pool and the slots of the LTE resource pool partially overlap as illustrated in FIG. 10F, the slots that are common for LTE Resource pool and the NR resource pool have NR SL slots that are not configured with PSFCH transmission occasions. The slots used for only the NR resource pool (and not the LTE resource pool) can be configured with PSFCH transmission occasions.

Figure 21:
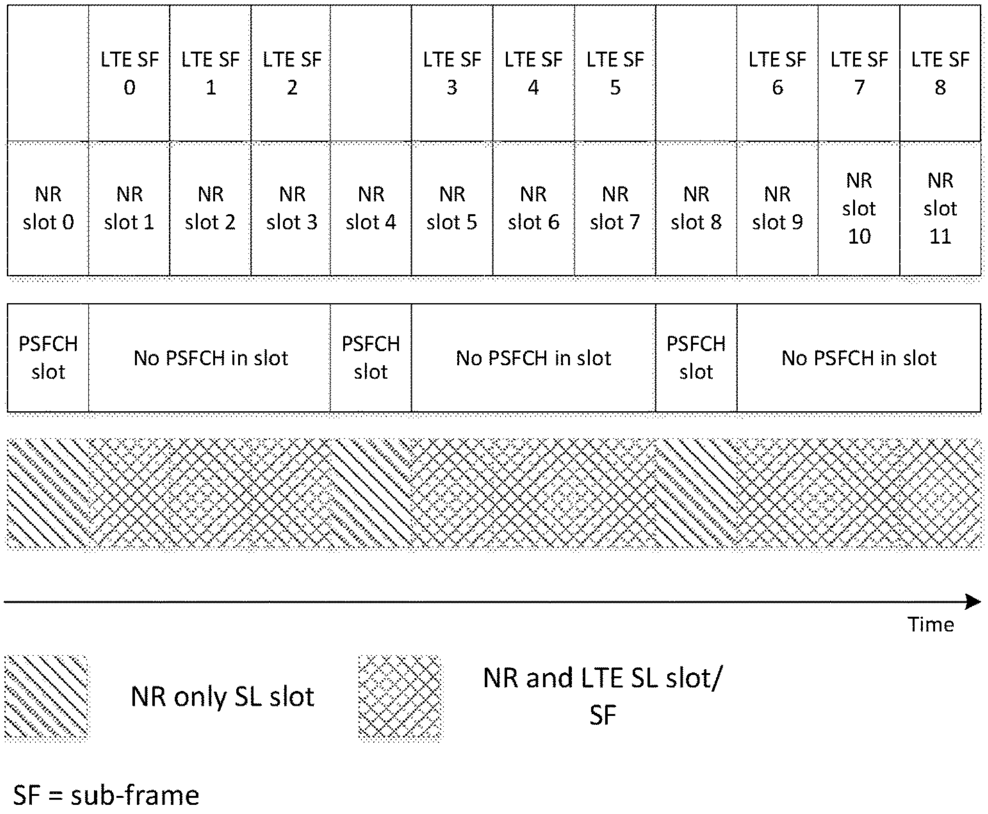

FIG. 21 illustrates an example, with $$N_{PSSCH}^{PSFCH} = 4$$

for every four slots in the NR resource pool, there is one slot that has PSFCH transmission occasion. The slot that has PSFCH transmission occasion is not in the LTE resource pool. The three slots that don't have a PSFCH transmission occasion are in the LTE resource pool. In this example, slots that have PSFCH occasions are only in the NR resource pool. Slots that don't have PSFCH occasions are shared between the NR resource pool and the LTE resource pool.

Figure 22:
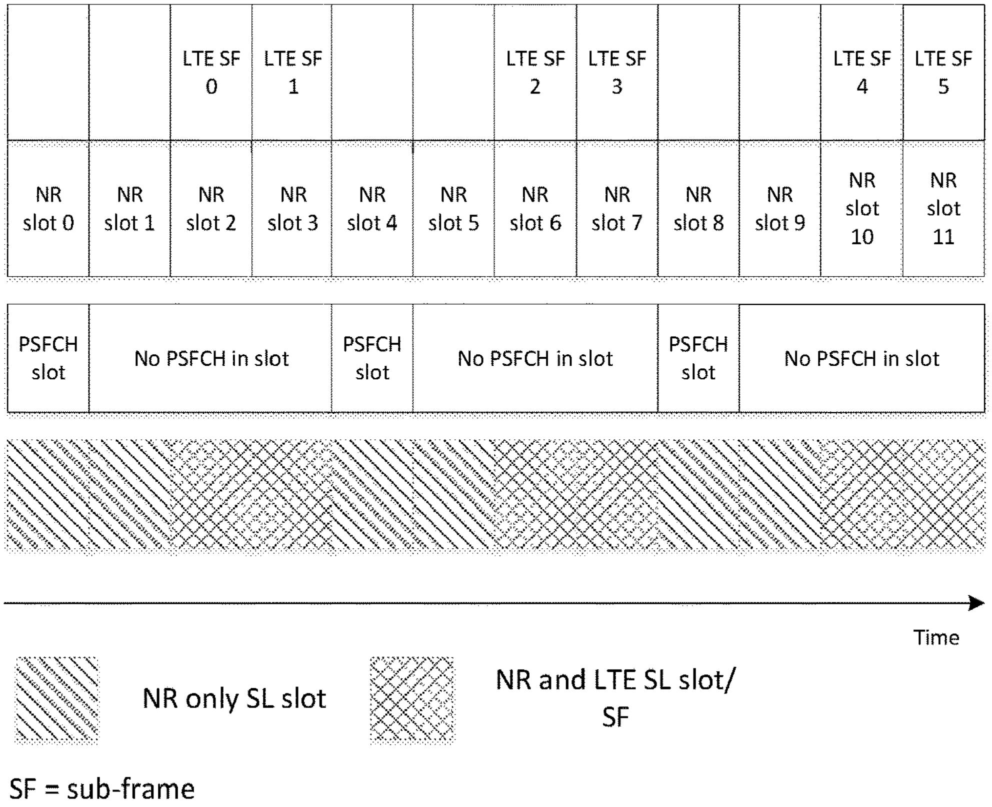

FIG. 22 illustrates another example, with $$N_{PSSCH}^{PSFCH} = 4$$

for every four slots in the NR resource pool, there is one slot that has PSFCH transmission occasion. The slot that has PSFCH transmission occasion is not in the LTE resource pool. Two of the three slots that don't have a PSFCH transmission occasion are in the LTE resource pool, the third slot that doesn't have a PSFCH transmission occasion is not in the LTE resource pool. In this example, slots that have PSFCH occasions are only in the NR resource pool. Slots that don't have PSFCH occasions are either in the NR resource pool or shared between the NR resource pool and the LTE resource pool.

Although FIGS. 19, 20, 21, and 22 illustrate examples where slots used for only the NR resource pool can be configured with PSFCH transmission occasions, various changes may be made to FIGS. 19, 20, 21, and 22. For example, various changes to the number of slots, the symbol types, the symbol sizes, etc., could be made according to particular needs.

In one example, to mitigate the change in power in a NR slot that has PSFCH transmission occasion, PSSCH/PSCCH and PSFCH from a UE are transmitted in the same slot, i.e., a slot that has a PSFCH transmission occasions.

In one example, if a UE transmits PSSCH/PSCCH in a slot configured with a PSFCH transmission occasion, the UE also transmits PSFCH in the PSFCH transmission occasion of the slot.

In one example, the UE uses the same transmit power for PSSCH/PSCCH and for PSFCH.

In one example, PSFCH transmissions occupy the same PRBs as the PSSCH/PSCCH transmitted from the UE. PSFCH is transmitted in a PRB, therefore multiple PSFCH are transmitted, with one PSFCH transmitted in one PRB.

In one example, PSFCH transmission occupies one PRB.

In one example, PSFCH transmission occupies one PRB per sub-channel for each sub-channel occupied by the PSSCH/PSCCH transmitted from the UE.

In one example, PSFCH transmission can be in PRBs or sub-channels of the PSSCH/PSCCH as well as PRBs or sub-channels not used by the PSSCH/PSCCH.

In one example, a slot is configured with a PSFCH transmission occasion, a UE checks if there is an LTE SL transmission in the slot. For example, this can be based on:

(1) information the UE obtains from an LTE SL module in the UE, e.g., LTE SL sensing information and/or LTE SL resource reservation information and/or candidate LTE resources and/or resources for UE's own LTE SL transmission or reservation; and/or (2) inter-UE co-ordination information the UE receives about LTE SL transmissions and/or reservations.

Figure 23:
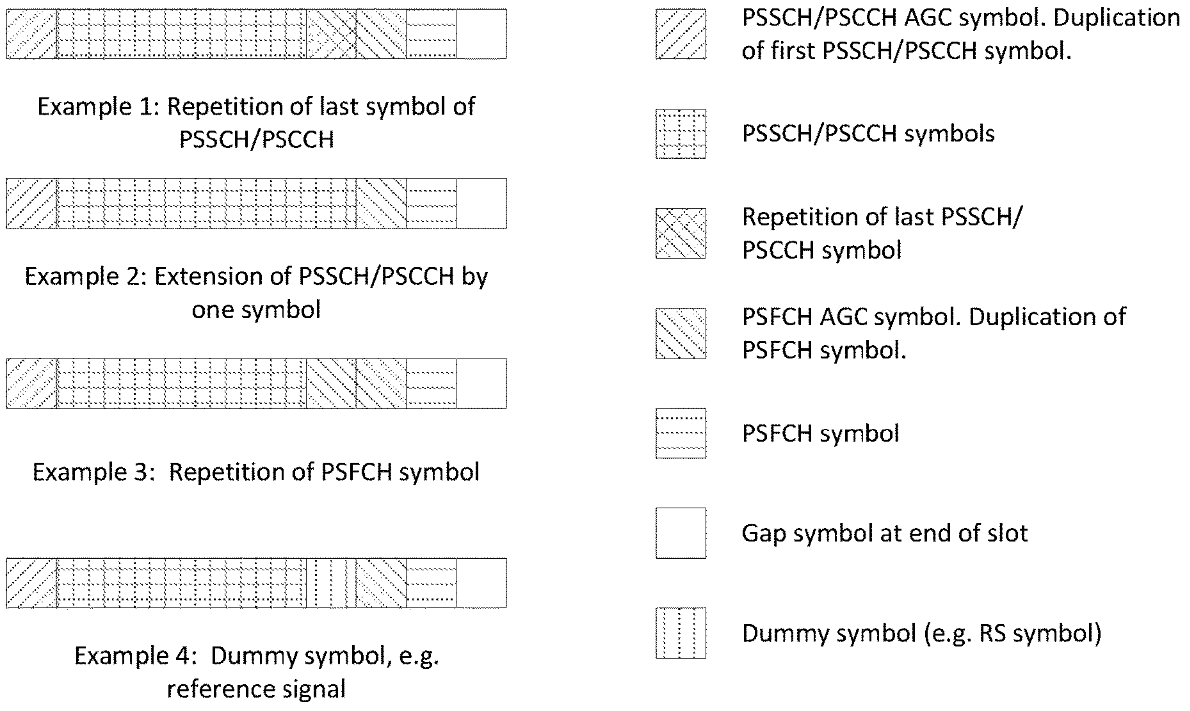
FIG. 23 illustrates examples of transmission in the gap symbol between PSSCH/PSCCH and PSFCH according to embodiments of the present disclosure.

In a sub-example, if there is an LTE SL transmission in the slot based on the check, and the UE has a PSSCH/PSCCH for transmission in the slot, the UE transmits PSFCH in the slot after the PSSCH/PSSCH. The UE can also transmit in the gap symbol between PSSCH/PSCCH and PSFCH as illustrated in FIG. 23. PSSCH/PSCCH and PSFCH can be transmitted with a same power.

FIG. 23 illustrates examples of transmission in the gap symbol between PSSCH/PSCCH and PSFCH according to embodiments of the present disclosure. The examples of transmission in the gap symbol between PSSCH/PSCCH and PSFCH in FIG. 23 are for illustration only. Different embodiments of transmission in the gap symbol between PSSCH/PSCCH and PSFCH can be used without departing from the scope of this disclosure.

In a sub-example, if there is no LTE SL transmission in the slot based on the check, and the UE has a PSSCH/PSCCH for transmission in the slot, it can be up to the UE whether it transmits PSFCH in the slot after the PSSCH/PSSCH. In one further example, if the UE transmits PSFCH the UE can also transmit in the gap symbol between PSSCH/PSCCH and PSFCH as illustrated in FIG. 23. In one further example, if the UE transmits PSFCH the UE doesn't transmit in the gap symbol between PSSCH/PSCCH and PSFCH.

In a sub-example, if there is an LTE SL transmission in the slot based on the check, if the UE has a PSSCH/PSCCH for transmission in the slot and the UE has a PSFCH transmission in the slot, the UE transmits PSSCH/PSCCH and PSFCH, e.g., with a same power, otherwise there is no PSSCH/PSCCH or PSFCH transmission in the slot. The UE can also transmit in the gap symbol between PSSCH/PSCCH and PSFCH, when transmitting both, as illustrated in FIG. 23.

In one example, if a UE transmits PSFCH in a PSFCH occasion of a slot in slot configured with a PSFCH transmission occasion, the UE also transmits PSSCH/PSCCH in the slot.

In one example, the UE uses the same transmit power for PSFCH and for PSSCH/PSCCH.

In one example, PSSCH/PSCCH uses PRB or PRBs corresponding to the PRB or PRBs used by the PSFCH.

In one example, PSSCH/PSCCH uses sub-channel or sub-channels corresponding to the PRB or PRBs used by the PSFCH. For example, if PSFCH uses PRB x, PSSCH/PSCCH uses the sub-channel that includes PRB x.

In one example, PSSCH/PSCCH uses sub-channel or sub-channels and the PRB or PRBs used by the PSFCH are included in the sub-channel or sub-channels used by the PSSCH/PSCCH. There could also be sub-channels that don't include any PSFCH PRBs.

In one example, PSSCH/PSCCH uses sub-channel or sub-channels and the PRB or PRBs used by the PSFCH may or may not be included in the sub-channel or sub-channels used by the PSSCH/PSCCH.

In one example, the PSSCH/PSCCH transmission is a placeholder transmission, e.g., the source and destination IDs can be the ID of the UE transmitting the PSSCH/PSCCH. In another example, the PSSCH/PSCCH can include dummy symbols or reference symbols. In another example PSSCH can include dummy symbols or reference symbols.

In one example, the gap symbol between PSSCH/PSCCH transmission and PSFCH transmission is eliminated as illustrated in FIG. 23, this can be to have continuous transmission across the slot without a change in power.

In one example, the last PSSCH/PSCCH symbol is repeated.

In one example, the PSSCH/PSCCH transmission is extended by one symbol.

In one example, the PSFCH symbol is repeated.

In one example, there is a dummy transmission (e.g., a reference signal) in the gap symbol.

Although FIG. 23 illustrates examples of transmission in the gap symbol between PSSCH/PSCCH and PSFCH, various changes may be made to FIG. 23. For example, various changes to the number of slots, the symbol types, the symbol sizes, etc., could be made according to particular needs.

Higher layer parameter, sl-NumMuxCS-Pair, denoted as $$N_{CS}^{PSFCH},$$

provides the number of cyclic per PRB. In one example, when the UE transmits PSSCH/PSCCH and PSFCH in a same slot, e.g., to avoid fluctuation of the power within the slot, $$N_{CS}^{PSFCH} = 1.$$

FIGS. 24A-24D and FIGS. 25A-25B illustrate examples of methods where a UE transmits PSSCH/PSCCH and PSFCH in a same slot according to embodiments of the present disclosure. Embodiments of the methods illustrated in FIGS. 24A-24D and FIGS. 25A-25B are for illustration only. One or more of the components illustrated in FIGS. 24A-24D and FIGS. 25A-25B may be implemented in specialized circuitry configured to perform the noted functions or one or more of the components may be implemented by one or more processors executing instructions to perform the noted functions. Other embodiments of methods where a UE transmits PSSCH/PSCCH and PSFCH in a same slot could be used without departing from the scope of this disclosure.

In one example as illustrated in FIGS. 24A-24D, a UE has a PSFCH to transmit in a slot. The UE first checks if there is an LTE SL transmission in the same slot. For example, this can be based on:

(1) information the UE obtains from an LTE SL module in the UE, e.g., LTE SL sensing information and/or LTE SL resource reservation information and/or candidate LTE resources and/or resources for UE's own LTE SL transmission or reservation; and/or (2) inter-UE co-ordination information the UE receives about LTE SL transmissions and/or reservations.

The LTE SL transmission can use different frequency resources, e.g., different sub-channels or different PRBs from those of the PSFCH transmission.

Figure 24A:
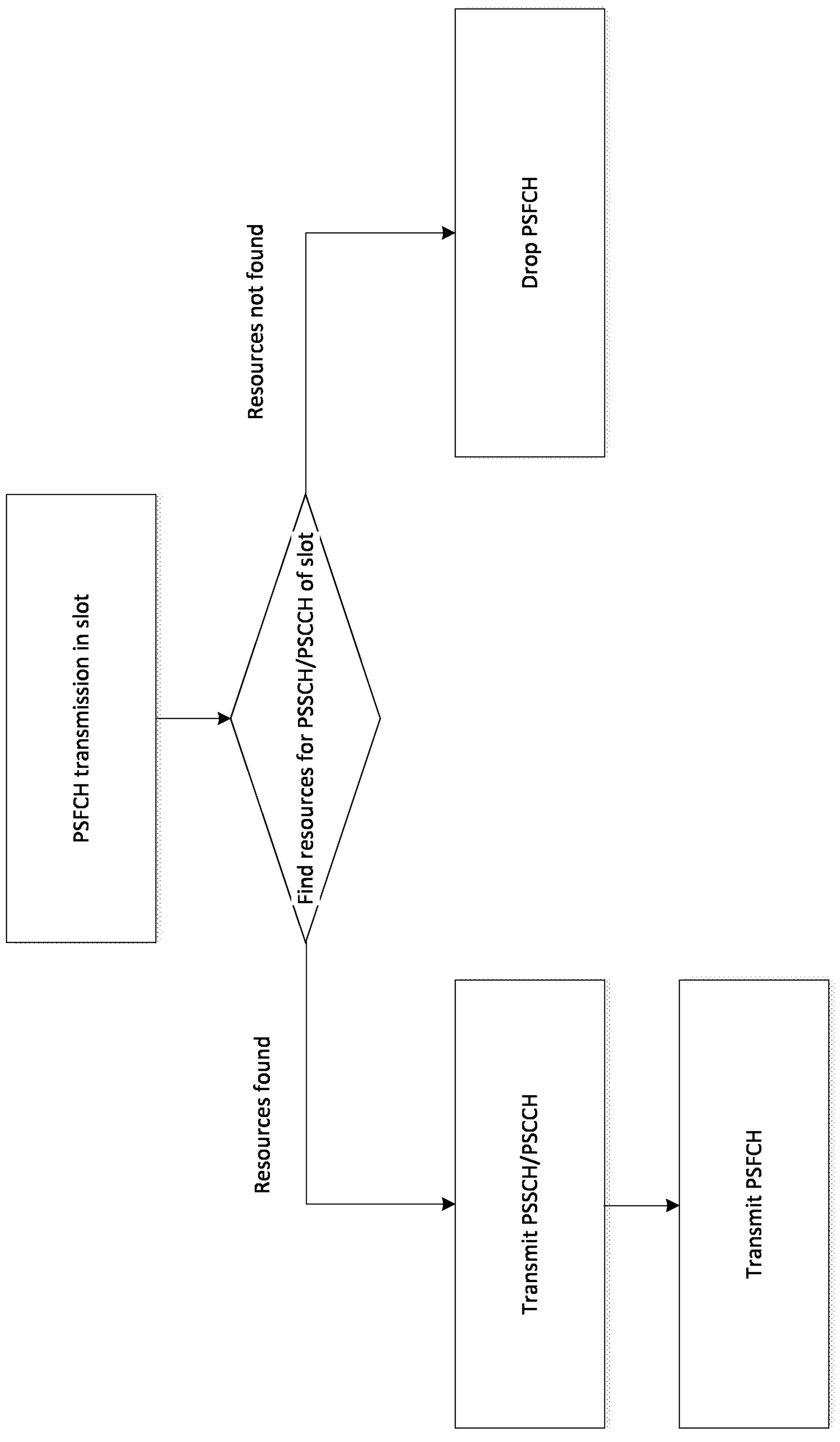
FIGS. 24A-24D and 25A-25B illustrate examples of methods where a UE transmits PSSCH/PSCCH and PSFCH in a same slot according to embodiments of the present disclosure.
Figure 24B:
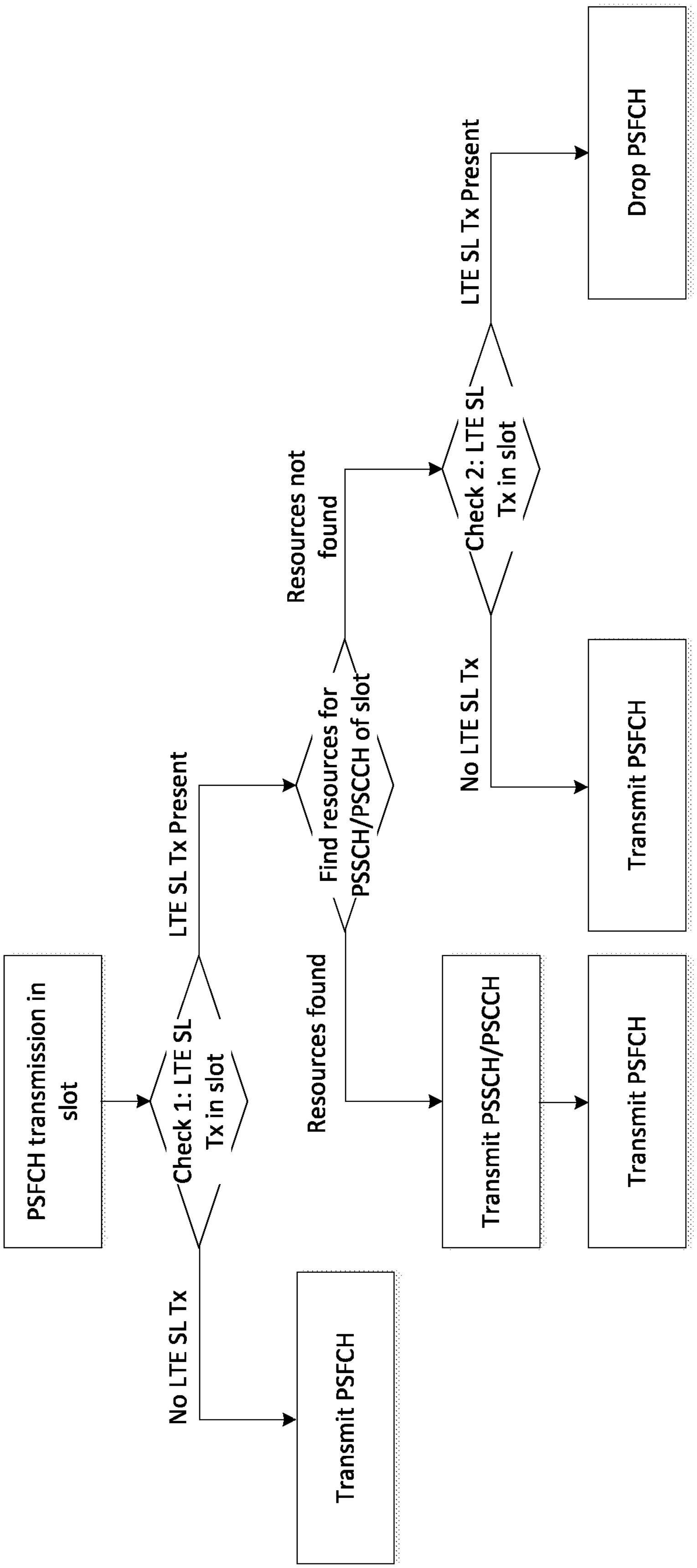
Figure 24C:
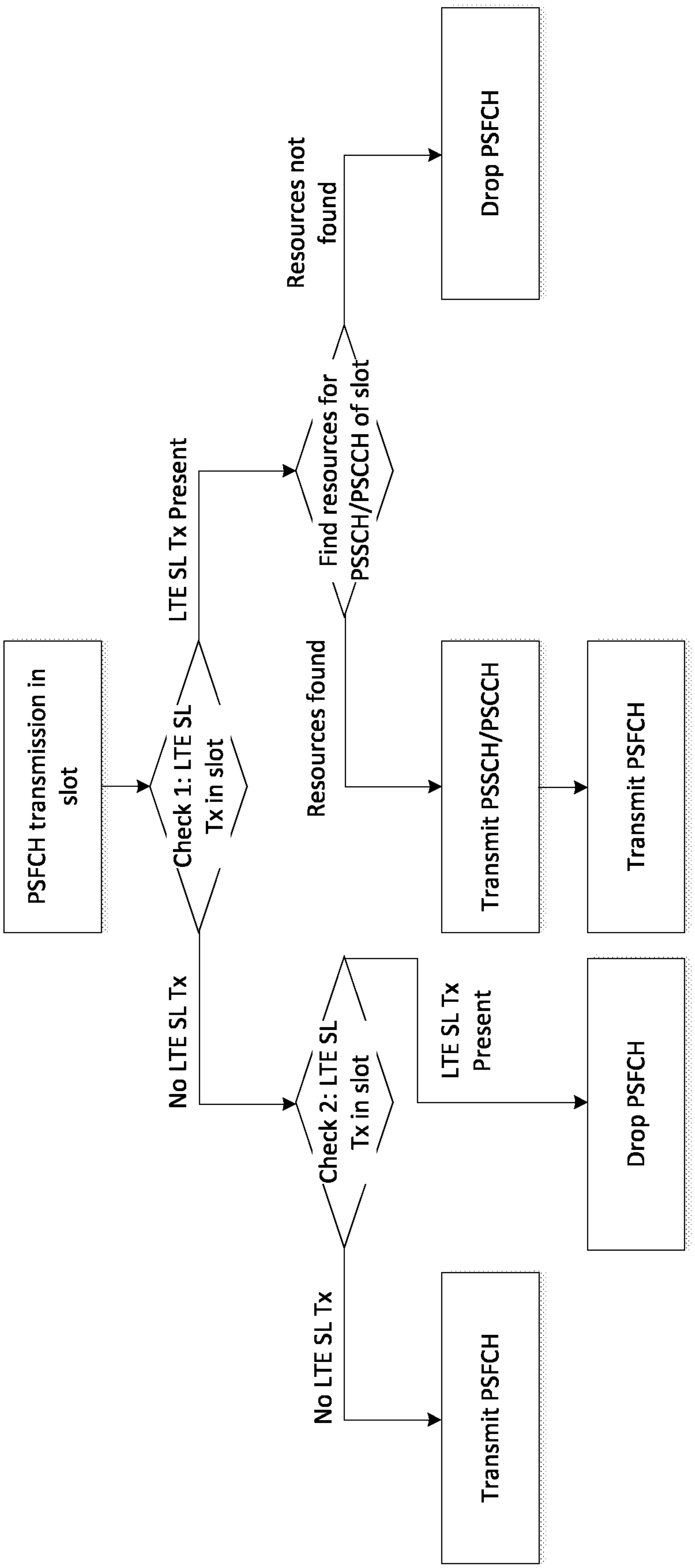
Figure 24D:
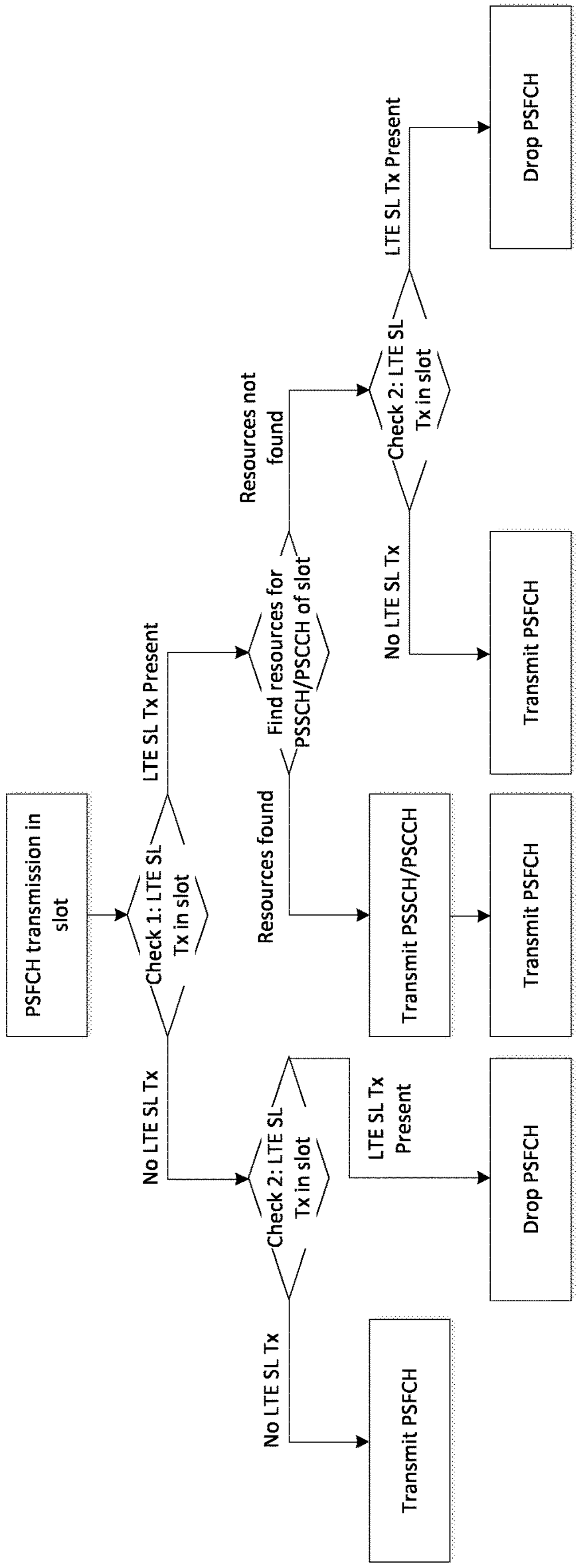

(1) If there is an LTE SL transmission based on the first check, (a) the UE finds candidate SL resources for PSSCH/PSCCH in the slot and the UE transmits in the symbols allocated to PSSCH/PSCCH of that slot as described earlier, the UE transmits PSFCH. The transmission in the PSSCH/PSCCH symbols and the gap symbol between PSSCH/PSCCH and PSFCH (e.g., if there is a transmission in the gap symbol) can use the same transmit power as PSFCH. (b) if no candidate SL resources for PSSCH/PSCCH in the slot are found, the UE can drop the PSFCH transmission as illustrated in FIG. 24A and FIG. 24C. In a further example as illustrated in FIG. 24B and FIG. 24D, before dropping the PSFCH transmission, the UE can second check (e.g., based on energy detection in the first few symbols of the slot, e.g., in one or more symbols before the PSFCH transmission in the slot) if there is an LTE SL transmission, in case of presence of an LTE SL transmission based on the second check the UE can drop the PSFCH. In case of non-presence of an LTE SL transmission based on the second check, the UE can transmit PSFCH.

(2) If there is no LTE SL transmission based on the first check, the UE can transmit PSFCH as illustrated in FIG. 24A and FIG. 24B. In a further example, before dropping the PSFCH transmission as illustrated in FIG. 24C and FIG. 24D, the UE can second check (e.g., based on energy detection in the first few symbols of the slot, e.g., in one or more symbols before the PSFCH transmission in the slot) if there is an LTE SL transmission, in case of presence of an LTE SL transmission based on the second check the UE can drop the PSFCH. In case of non-presence of an LTE SL transmission based on the second check, the UE can transmit PSFCH.

Figure 25A:
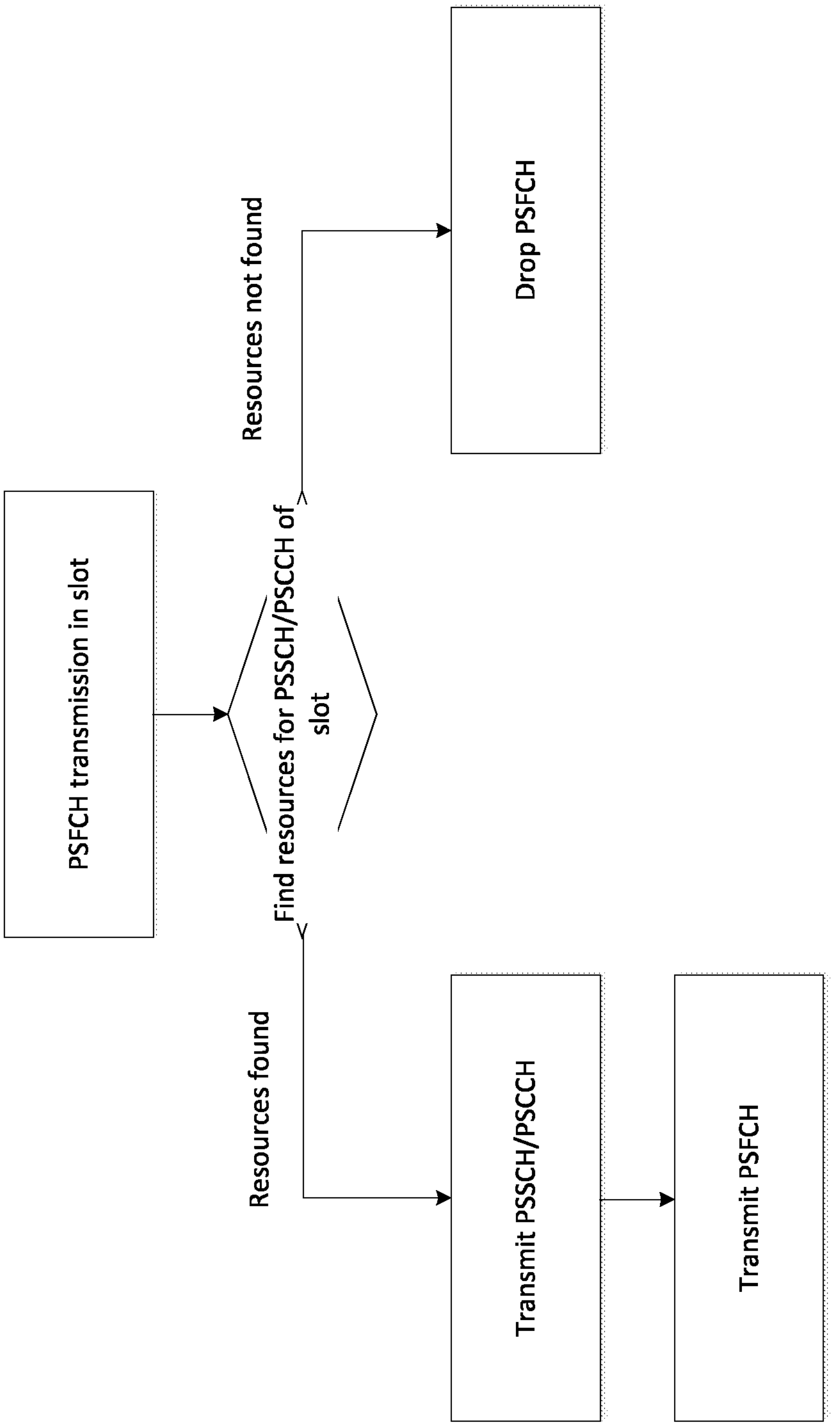
Figure 25B:
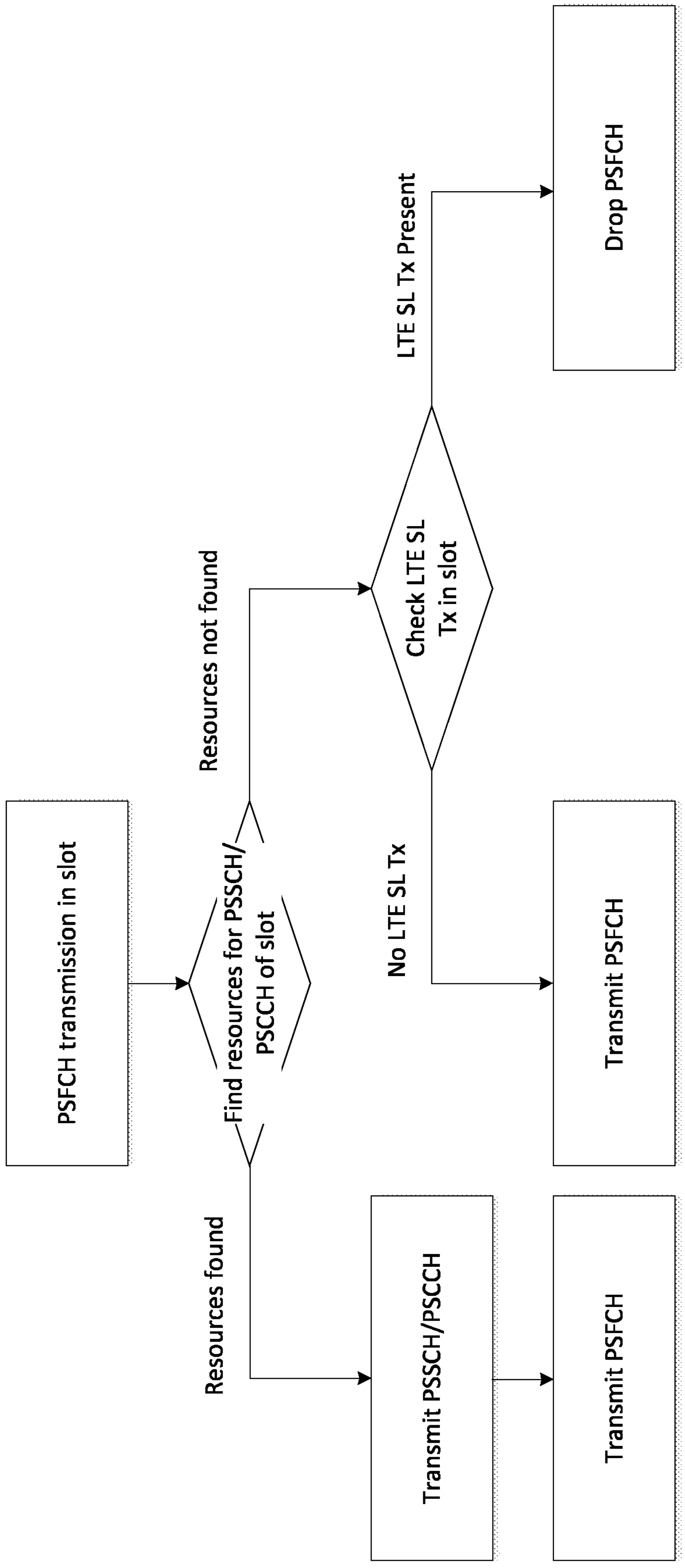

In one example as illustrated in FIGS. 25A-25B, a UE has a PSFCH to transmit in a slot.

(1) the UE finds candidate SL resources for PSSCH/PSCCH in the slot and the UE transmits in the symbols allocated to PSSCH/PSCCH of that slot as described earlier, and the UE transmits PSFCH. The transmission in the PSSCH/PSCCH symbols and the gap symbol between PSSCH/PSCCH and PSFCH (e.g., if there is a transmission in the gap symbol) can use the same transmit power as PSFCH.

(2) if no candidate SL resources for PSSCH/PSCCH in the slot are found, the UE can drop the PSFCH transmission as illustrated in FIG. 25A. In a further example as illustrated in FIG. 25B, before dropping the PSFCH transmission, the UE can check if there is an LTE SL transmission in the slot. For example, this can be based on:

(1) information the UE obtains from an LTE SL module in the UE, e.g., LTE SL sensing information and/or LTE SL resource reservation information and/or candidate LTE resources and/or resources for UE's own LTE SL transmission or reservation; and/or (2) inter-UE co-ordination information the UE receives about LTE SL transmissions and/or reservations; and/or (3) Energy detection in one or more symbols before PSFCH (e.g., in the gap symbol between PSSCH/PSCCH and PSFCH, and/or in another example, a symbol before the gap symbol between PSSCH/PSCCH and PSFCH)

In case of presence of an LTE SL transmission based on the check the UE can drop the PSFCH. In case of non-presence of an LTE SL transmission based on the check, the UE can transmit PSFCH.

Although FIGS. 24A-24D and FIGS. 25A-25B illustrate examples of methods where a UE transmits PSSCH/PSCCH and PSFCH in a same slot, various changes may be made to FIGS. 24A-24D and FIGS. 25A-25B. For example, while shown as a series of steps, various steps in FIGS. 24A-24D and FIGS. 25A-25B could overlap, occur in parallel, occur in a different order, or occur any number of times.

In one example, a PSFCH transmission overlaps an LTE transmission in a subframe, if the there is a PSSCH/PSCCH in a NR slot that overlaps the start of the LTE sub-frame, and the power of the PSSCH/PSCCH transmission equals that of the PSFCH transmission, the PSFCH can be transmitted, else the PSFCH transmission is dropped or cancelled.

In one example, a PSFCH transmission overlaps an LTE transmission in a subframe, if the there is a PSSCH/PSCCH in a NR slot that overlaps the start of the LTE sub-frame, and the power of the PSSCH/PSCCH transmission is equal to or greater than that of the PSFCH transmission, the PSFCH can be transmitted, else the PSFCH transmission is dropped or cancelled.

In one example, a parameter can be pre-configured or configured/updated by RRC signaling and/or MAC CE signaling and L1 control signaling. The parameter can have two states e.g., state A or state B, a state, for example, can be a parameter value or whether or not a parameter is configured. A UE transmitting PSSCH/PSCCH checks if the corresponding PSFCH overlaps, in time, with an LTE transmission.

If the parameter state is A, if there is an LTE transmission in a sub-frame that overlaps, in time, with a PSFCH corresponding to the PSSCH/PSCCH transmission, the UE doesn't transmit PSSCH/PSCCH.

If the parameter state is B, the PSSCH/PSCCH transmission can proceed regardless of whether or not an LTE transmission in a sub-frame overlaps, in time, with a PSFCH corresponding to the PSSCH/PSCCH transmission.

In one example, when the UE transmits PSSCH/PSCCH in a slot that has PSFCH transmission occasion, the power is ramped down towards the end of the PSSCH/PSCCH transmission.

In one example, the ramping down of power is done continuously across one or more symbols.

In one example, the ramping down of power is done symbol-wise e.g., the power is constant within one symbol, but the power of adjacent symbols can be different.

In one example, the ramping down of power is done symbol-group-wise e.g., the power is constant within one symbol-group, but the power of adjacent symbol groups can be different.

FIGS. 26A-26E illustrate examples of power ramping down according to embodiments of the present disclosure. The examples of power ramping down in FIGS. 26A-26E are for illustration only. Different embodiments of power ramping down could be used without departing from the scope of this disclosure.

Figure 26A:
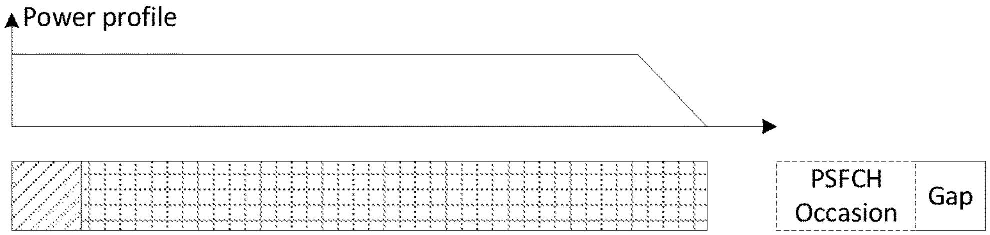
FIGS. 26A-26E illustrate examples of power ramping down according to embodiments of the present disclosure.

In the example illustrated in FIG. 26A, the ramping down of power is done continuously across the last symbol of PSSCH/PSCCH.

Figure 26B:
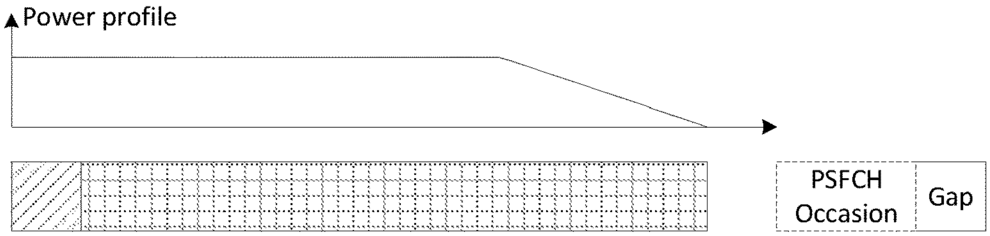

In the example illustrated in FIG. 26B, the ramping down of power is done continuously across the last N symbol of PSSCH/PSCCH. In one example, N can be specified in the system specifications and/or pre-configured and/or configured by higher layer RRC signaling and/or configured by MAC CE and/or DCI. In one example, if N is not pre-configured or configured by RRC signaling or configured by MAC CE or DCI a value specified in the system specifications is used.

Figure 26C:
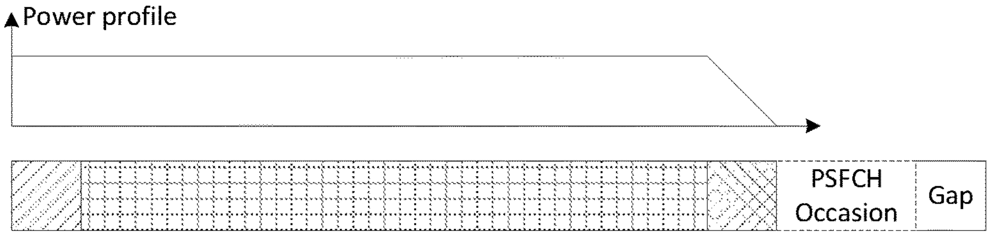

In the example illustrated in FIG. 26C, an extra symbol is added after the PSSCH/PSCCH as described herein (e.g., a repetition of the last symbol of PSSCH/PSCCH or extension of PSSCH/PSCCH by one symbol or dummy symbol). In this example, the ramping down of power is done continuously across the added symbol.

Figure 26D:
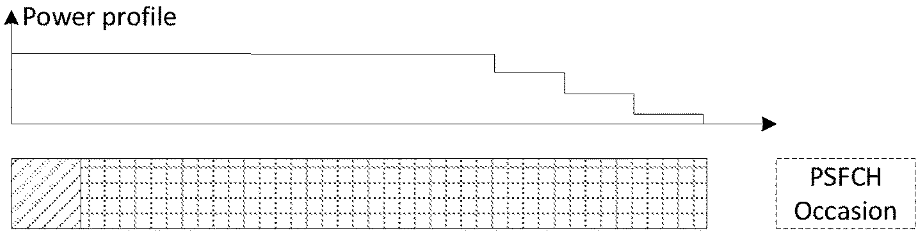

In the example illustrated in FIG. 26D, the ramping down of power is done symbol-wise across the last N symbol of PSSCH/PSCCH. In one example, N can be specified in the system specifications and/or pre-configured and/or configured by higher layer RRC signaling and/or configured by MAC CE and/or DCI. In one example, if N is not pre-configured or configured by RRC signaling or configured by MAC CE or DCI a value specified in the system specifications is used. In one example N=1.

Figure 26E:
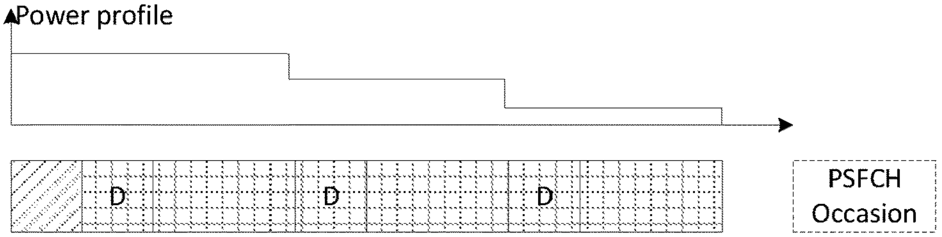

In the example illustrated in FIG. 26E, the ramping down of power is done symbol-group-wise across the last N symbols (or N symbol groups) of PSSCH/PSCCH. In one example, N (or Ng) can be specified in the system specifications and/or pre-configured and/or configured by higher layer RRC signaling and/or configured by MAC CE and/or DCI. In one example, if N (or Ng) is not pre-configured or configured by RRC signaling or configured by MAC CE or DCI a value specified in the system specifications is used. In one example Ng=1. In one example, a group of symbols includes a PSSCH DMRS symbol.

Although FIGS. 26A-26E illustrate examples of power ramping down, various changes may be made to FIGS. 26A-26E. For example, various changes to the number of slots, the symbol types, the power profile, etc., could be made according to particular needs.

In one example, a slot is configured with a PSFCH transmission occasion, a UE checks if there is an LTE SL transmission in the slot. For example, this can be based on:

(1) information the UE obtains from an LTE SL module in the UE, e.g., LTE SL sensing information and/or LTE SL resource reservation information and/or candidate LTE resources and/or resources for UE's own LTE SL transmission or reservation; and/or (2) inter-UE co-ordination information the UE receives about LTE SL transmissions and/or reservations.

In a sub-example, if there is an LTE SL transmission in the slot based on the check, and the UE has a PSSCH/PSCCH for transmission in the slot, the UE ramps down the power or transmits in the gap between PSSCH/PSCCH and PSFCH similar as described regarding the examples of FIGS. 26A-26E. In a sub-example, if there is no LTE SL transmission in the slot based on the check, and the UE has a PSSCH/PSCCH for transmission in the slot, the UE transmits PSSCH/PSCCH without power ramping.

In one example, when the UE transmits PSFCH in a PSFCH transmission occasion, the power is ramped up towards the start of the PSFCH transmission.

In one example, the ramping up of power is done continuously across one or more symbols.

In one example, the ramping up of power is done symbol-wise e.g., the power is constant within one symbol, but the power of adjacent symbols can be different.

Figure 27A:
FIGS. 27A-27C illustrate examples of power ramping up according to embodiments of the present disclosure.
Figure 27B:
Figure 27C:

FIGS. 27A-27C illustrate examples of power ramping up according to embodiments of the present disclosure. The examples of power ramping up in FIGS. 27A-27C are for illustration only. Different embodiments of power ramping up could be used without departing from the scope of this disclosure.

In the example illustrated in FIG. 27A, the ramping up of power is done continuously across the first symbol of PSFCH (i.e., the AGC or duplicate symbol.

In the example illustrated in FIG. 27B, an extra symbol is added before the PSFCH transmission as described herein (e.g., a repetition of the PSFCH symbol). In this example ramping up of power is done continuously across the added symbol.

In the example illustrated in FIG. 27C, the ramping up of power is done symbol-wise across the first symbol of PSFCH.

Although FIGS. 27A-27C illustrate examples of power ramping up, various changes may be made to FIGS. 27A-27C. For example, various changes to the number of slots, the symbol types, the power profile, etc., could be made according to particular needs.

In one example, a slot is configured with a PSFCH transmission occasion, a UE checks if there is an LTE SL transmission in the slot. For example, this can be based on:

(1) information the UE obtains from an LTE SL module in the UE, e.g., LTE SL sensing information and/or LTE SL resource reservation information and/or candidate LTE resources and/or resources for UE's own LTE SL transmission or reservation; and/or (2) inter-UE co-ordination information the UE receives about LTE SL transmissions and/or reservations; and/or (3) Energy detection in one or more symbols before PSFCH (e.g., in the gap symbol between PSSCH/PSCCH and PSFCH, and/or in another example, a symbol before the gap symbol between PSSCH/PSCCH and PSFCH).

In a sub-example, if there is an LTE SL transmission in the slot based on the check, and the UE has a PSFCH for transmission in the slot, the UE ramps up the power or transmits in the gap between PSSCH/PSCCH and PSFCH as similar as described regarding the examples of FIGS. 27A-27C. In a sub-example, if there is no LTE SL transmission in the slot based on the check, and the UE has a PFSCH for transmission in the slot, the UE transmits PSFCH without power ramping.

In one example, if a UE transmits PSSCH/PSCCH and PSFCH in the same slot, PSSCH/PSCCH and PSFCH are transmitted with the same power, and a signal is transmitted in the gap between PSSCH/PSCCH and PSFCH as described herein. In this case, there is no ramp down or ramp up of power.

In one example, if a UE transmits PSSCH/PSCCH and PSFCH in the same slot, and PSSCH/PSCCH and PSFCH are transmitted with different power, a signal is transmitted in the gap between PSSCH/PSCCH and PSFCH as described herein. The power can be ramped down or up between PSSCH/PSCCH and PSFCH.

- In one example, the ramp down or ramp up is during the symbol transmitted in the gap between PSSCH/PSCCH and PSFCH.
- In one example, the ramp down or ramp up is during the symbol transmitted in the gap between PSSCH/PSCCH and PSFCH as well as one more symbols of PSSCH/PSCCH similar as described regarding the examples of FIGS. 26A-26E.
- In one example, the ramp down or ramp up is during the symbol transmitted in the gap between PSSCH/PSCCH and PSFCH as well as PSFCH as described in the examples of FIGS. 27A-27C.
- In one example, the ramp down or ramp up is during the symbol transmitted in the gap between PSSCH/PSCCH and PSFCH as well as one more symbols of PSSCH/PSCCH as described in the examples of FIGS. 26A-26E and the PSFCH similar as described regarding the examples of FIGS. 27A-27C.

In one example, if a UE transmits PSSCH/PSCCH and PSFCH in the same slot, and there is gap between PSSCH/PSCCH and PSFCH, the PSSCH/PSCCH power is ramped down towards the end of PSSCH/PSCCH as described earlier, the PSFCH power is ramped up towards the start of the PSFCH as described earlier.

In one example, when the UE transmits PSSCH/PSCCH in a slot that has PSFCH transmission occasion, but the UE doesn't transmit PSFCH, the power is ramped down towards the end of the PSSCH/PSCCH transmission as described earlier.

In one example, when the UE transmits PSFCH in a PSFCH transmission occasion and doesn't transmit PSSCH/PSCCH, the power is ramped up towards the start of the PSFCH transmission as described earlier.

Figure 28:
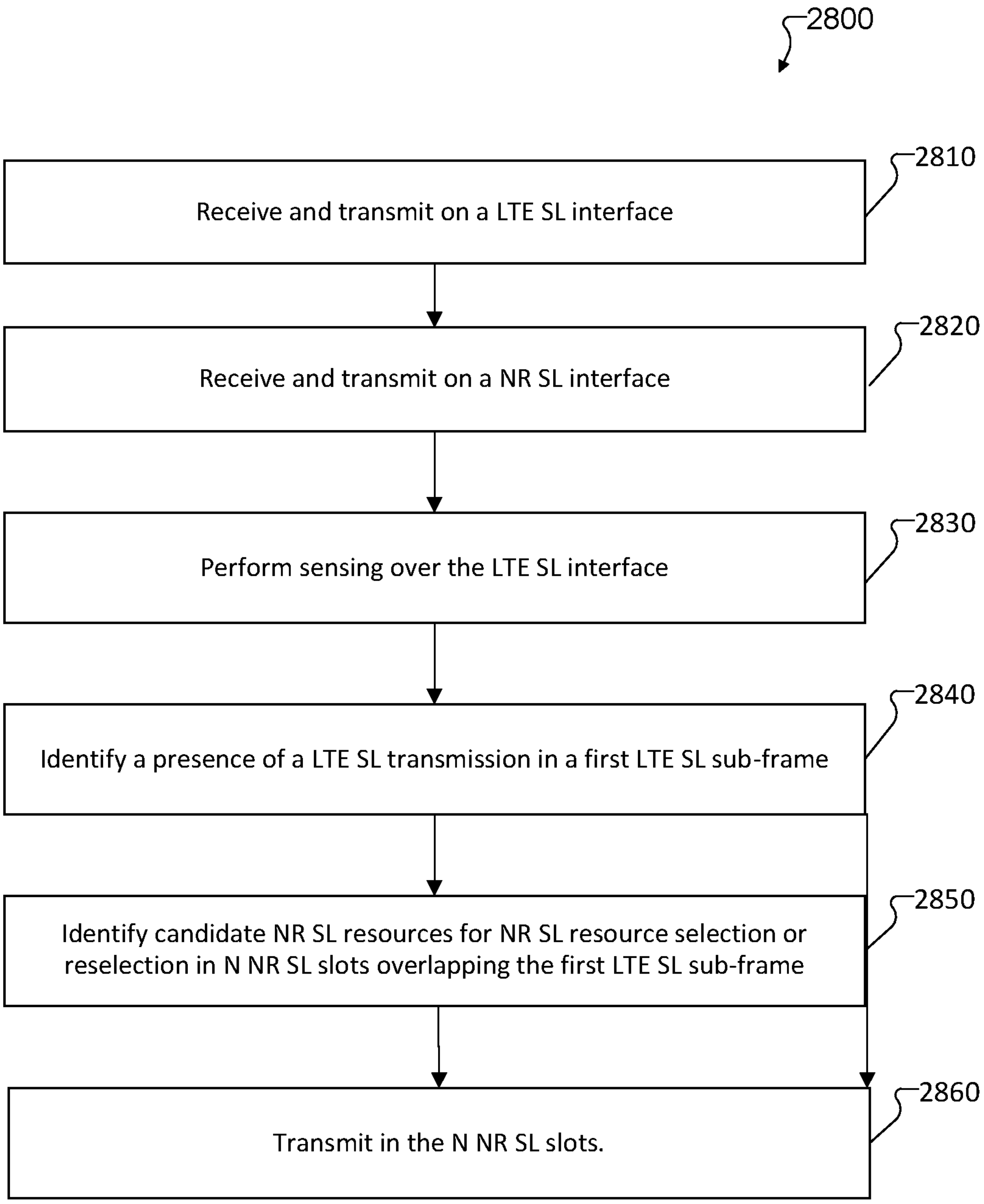
FIG. 28 illustrates a method for LTE/NR co-existence according to embodiments of the present disclosure.

FIG. 28 illustrates a method 2800 for LTE/NR co-existence according to embodiments of the present disclosure. An embodiment of the method illustrated in FIG. 28 is for illustration only. One or more of the components illustrated in FIG. 28 may be implemented in specialized circuitry configured to perform the noted functions or one or more of the components may be implemented by one or more processors executing instructions to perform the noted functions. Other embodiments of LTE/NR co-existence could be used without departing from the scope of this disclosure.

As illustrated in FIG. 28, the method 2800 begins at step 2810. At step 2810, a UE receives and transmits on a LTE SL interface. At step 2820, the UE receives and transmits on a NR SL interface. At step 2830 the UE performs sensing over the LTE SL interface. Performing the sensing may include decoding SCI and measuring an SL-RSRP associated with the SCI. At step 2840, UE identifies a presence of a LTE SL transmission in a first LTE SL sub-frame. At step 2850, the UE identifies candidate NR SL resources for NR SL resource selection or reselection in N NR SL slots overlapping the first LTE sub-frame. Finally, at step 2860, the UE transmits in the N NR SL slots.

Although FIG. 28 illustrates one example of a method 2800 of d LTE/NR co-existence, various changes may be made to FIG. 28. For example, while shown as a series of steps, various steps in FIG. 28 could overlap, occur in parallel, occur in a different order, or occur any number of times.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive and transmit on a LTE sidelink (SL) interface with a first sub-carrier spacing (SCS), and
receive and transmit on a NR SL interface with a second SCS larger than the first SCS, wherein a LTE SL subframe overlaps in time with N NR SL slots, and
a processor operably coupled to the transceiver, the processor configured to:
perform sensing over the LTE SL interface, wherein to perform the sensing the processor is further configured to:
decode SL control information (SCI); and
measure an SL reference signal receive power (SL-RSRP) associated with the SCI,
identify a presence of a LTE SL transmission in a first LTE SL sub-frame; and
identify candidate NR SL resources for NR SL resource selection or reselection in N NR SL slots overlapping the first LTE SL sub-frame,
wherein the transceiver is further configured to;
for at least two consecutive NR SL slots of the N NR SL slots that overlap the first LTE SL sub-frame, eliminate a gap symbol between the two consecutive NR SL slots such that SL transmission is continuous across the two consecutive NR SL slots with a same transmission power; and
transmit in the N NR SL slots.

2. The UE of claim 1, wherein the first SCS is 15 kHz, the second SCS is 30 kHz, and N=2.

3. The UE of claim 1, wherein:
the processor is further configured to identify an absence of a LTE SL transmission in a second LTE SL sub-frame, and
the transceiver is further configured to transmit in one or more N NR SL slots overlapping the second LTE SL sub-frame.

4. The UE of claim 1, wherein a transmission power in the N NR SL slots are equal.

5. The UE of claim 1, wherein a transmission power in a first in time of the NR SL slots is not less than a transmission power in the remaining N−1 NR SL slots.

6. The UE of claim 1, wherein:

an NR SL slot includes physical SL feedback channel (PSFCH) symbols, and the transceiver is further configured to transmit a physical SL shared channel (PSSCH) and a PSFCH in the NR SL slot.

7. The UE of claim 6, wherein a transmission power of PSSCH and PSFCH are equal.

8. The UE of claim 6, wherein a transmission of power of PSSCH is not less than a transmission power of PSFCH.

9. The UE of claim 1, wherein NR SL slots with physical SL feedback channel (PSFCH) symbols don't overlap in time with sub-frames used for LTE SL transmission.

10. The UE of claim 1, wherein:

an NR SL slot includes physical SL feedback channel (PSFCH) symbols, the processor is further configured to detect the presence or absence of a LTE SL transmission in a LTE SL sub-frame overlapping in time with the NR SL slot, and the transceiver is configured to not transmit PSFCH in the NR SL slot if LTE SL transmission is present, and there is no physical SL shared channel (PSSCH) transmission in the NR SL slot.

11. A method of operating a user equipment (UE), the method comprising:

receiving and transmitting on a LTE sidelink (SL) interface with a first sub-carrier spacing (SCS);

receiving and transmitting on a NR SL interface with a second SCS larger than the first SCS, wherein a LTE SL subframe overlaps in time with N NR SL slots;

performing sensing over the LTE SL interface, wherein performing the sensing comprises:

decoding SL control information (SCI); and measuring an SL reference signal receive power (SL-RSRP) associated with the SCI;

identifying a presence of a LTE SL transmission in a first LTE SL sub-frame;

identifying candidate NR SL resources for NR SL resource selection or reselection in N NR SL slots overlapping the first LTE SL sub-frame;

for at least two consecutive NR SL slots of the N NR SL slots that overlap the first LTE SL sub-frame, eliminating a gap symbol between the two consecutive NR SL slots such that SL transmission is continuous across the two consecutive NR SL slots with a same transmission power; and transmitting in the N NR SL slots.

12. The method of claim 11, wherein the first SCS is 15 kHz, the second SCS is 30 kHz, and N=2.

13. The method of claim 11, further comprising:

identifying an absence of a LTE SL transmission in a second LTE SL sub-frame, and transmitting in one or more N NR SL slots overlapping the second LTE SL sub-frame.

14. The method of claim 11, wherein a transmission power in the N NR SL slots are equal.

15. The method of claim 11, wherein a transmission power in a first in time of the NR SL slots is not less than a transmission power in the remaining N−1 NR SL slots.

16. The method of claim 11, wherein an NR SL slot includes physical SL feedback channel (PSFCH) symbols, the method further comprising transmitting a physical SL shared channel (PSSCH) and a PSFCH in the NR SL slot.

17. The method of claim 16, wherein a transmission power of PSSCH and PSFCH are equal.

18. The method of claim 16, wherein a transmission of power of PSSCH is not less than a transmission power of PSFCH.

19. The method of claim 11, wherein NR SL slots with physical SL feedback channel (PSFCH) symbols don't overlap in time with sub-frames used for LTE SL transmission.

20. The method of claim 11, wherein an NR SL slot includes physical SL feedback channel (PSFCH) symbols, the method further comprising:

detecting the presence or absence of a LTE SL transmission in a LTE SL sub-frame overlapping in time with the NR SL slot, and refraining from transmitting PSFCH in the NR SL slot, if LTE SL transmission is present, and there is no physical SL shared channel (PSSCH) transmission in the NR SL slot.

* * * * *